US007010633B2

(12) United States Patent
Arndt et al.

(10) Patent No.: US 7,010,633 B2
(45) Date of Patent: Mar. 7, 2006

(54) APPARATUS, SYSTEM AND METHOD FOR CONTROLLING ACCESS TO FACILITIES BASED ON USAGE CLASSES

(75) Inventors: Richard Louis Arndt, Austin, TX (US); Bruce Leroy Beukema, Hayfield, MN (US); David F. Craddock, New Paltz, NY (US); Ronald Edward Fuhs, Rochester, MN (US); Thomas Anthony Gregg, Highland, NY (US); Bruce Marshall Walk, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 337 days.

(21) Appl. No.: 10/411,447

(22) Filed: Apr. 10, 2003

(65) Prior Publication Data

US 2004/0205253 A1 Oct. 14, 2004

(51) Int. Cl.
*G06F 13/14* (2006.01)
*G06F 15/173* (2006.01)
(52) U.S. Cl. .................. 710/243; 710/26; 709/240

(58) Field of Classification Search ................ 710/22, 710/23, 24, 26, 28, 243, 244; 709/238, 240; 719/313, 314
See application file for complete search history.

(56) References Cited

U.S. PATENT DOCUMENTS

| 6,718,392 B1 * | 4/2004 | Krause ..................... 709/238 |
| 6,804,729 B1 * | 10/2004 | Swanberg ................... 710/22 |
| 2002/0184392 A1 * | 12/2002 | Parthasarathy et al. ...... 709/249 |
| 2003/0046505 A1 * | 3/2003 | Craddock et al. ........... 711/165 |
| 2004/0193833 A1 * | 9/2004 | Hampton et al. ........... 711/206 |

* cited by examiner

*Primary Examiner*—Khanh Dang
(74) *Attorney, Agent, or Firm*—Duke W. Yee; Casimer K. Salys; Stephen J. Walder, Jr.

(57) ABSTRACT

An apparatus, system and method for controlling access to facilities based on usage class of a requestor are provided. With the apparatus, system and method, a two level protection mechanism is provided for protecting host channel adapter (HCA) facilities from unauthorized access. With the present invention, a first level of access is provided through virtual address translation and a mechanism for determining if the requestor of access may access a system memory address space page associated with a real address to which the virtual address maps. A second level of access is provided through the allocation of usage classes and determining a required usage class for accessing an HCA facility.

33 Claims, 12 Drawing Sheets

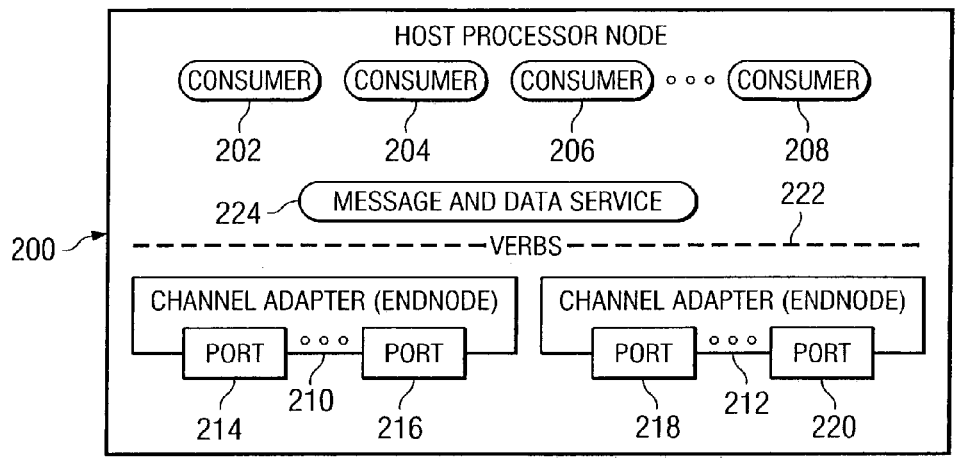
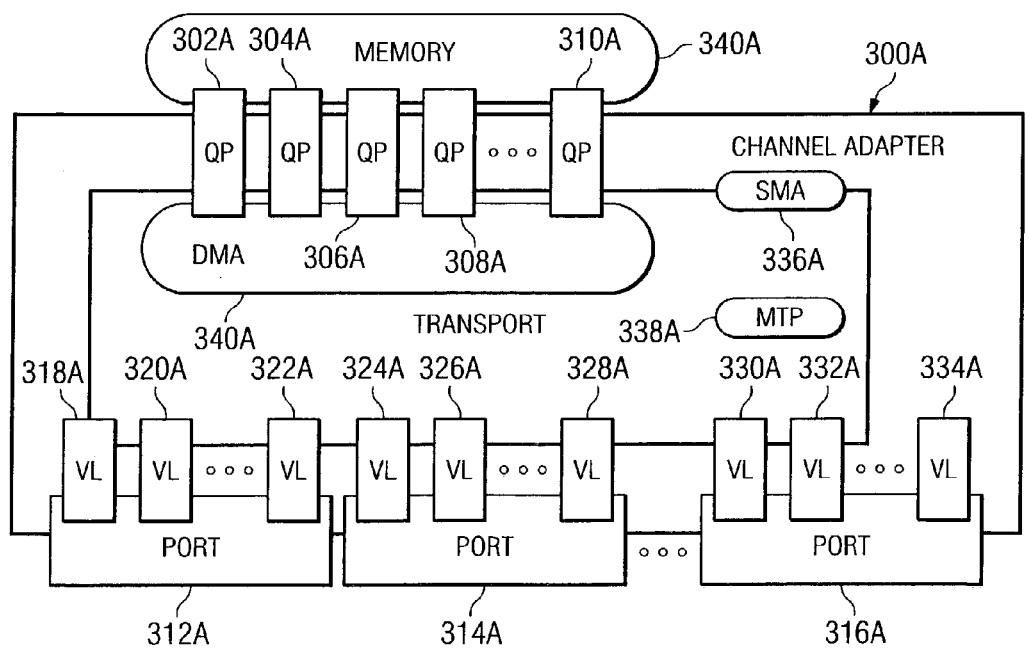

FIG. 13

| BAR → | USER ADD SPACE | PRIVILEGED SPACE | REAL ADD SPACE | SUPER PRIVILEGED SPACE | |
|---|---|---|---|---|---|
| | PAGE 1 | PAGE 2 | PAGE 3 | PAGE 4 | ← QP |
| | | | | | |
| SIZE = NUMBER OF QPs, CQs, EQs, MRs x PAGE SIZE | PAGE 5 | PAGE 6 | PAGE 7 | PAGE 8 | ← CQ |
| | | | | | |
| | PAGE 9 | PAGE 10 | PAGE 11 | PAGE 12 | ← EQ |
| | | | | | |
| | PAGE 13 | PAGE 14 | PAGE 15 | PAGE 16 | ← MR |
| | ⋮ | ⋮ | ⋮ | ⋮ | |

FIG. 14

| USER ADD SPACE | PRIVILEGED SPACE | REAL ADD SPACE | SUPER PRIVILEGED SPACE |
|---|---|---|---|
| FACILITY A<br>FACILITY B | FACILITY A<br>FACILITY B<br>FACILITY C<br>FACILITY D | FACILITY A<br>FACILITY D<br>FACILITY G | FACILITY A<br>FACILITY B<br>FACILITY C<br>FACILITY D<br>FACILITY E<br>FACILITY F<br>FACILITY G |

APPARATUS, SYSTEM AND METHOD FOR CONTROLLING ACCESS TO FACILITIES BASED ON USAGE CLASSES

BACKGROUND OF THE INVENTION

1. Technical Field

The present invention is directed to an apparatus, system and method for controlling access to facilities based on usage classes. More specifically, the present invention provides a mechanism for controlling access to host channel adapter facilities associated with a logical partition based on the usage class associated with an access requestor.

2. Description of Related Art

In a System Area Network (SAN), such as an InfiniBand (IB) network, the hardware provides a message passing mechanism that can be used for Input/Output devices (I/O) and interprocess communications (IPC) between general computing nodes. Processes executing on devices access SAN message passing hardware by posting send/receive messages to send/receive work queues on a SAN channel adapter (CA). These processes also are referred to as "consumers."

The send/receive work queues (WQ) are assigned to a consumer as a queue pair (QP). The messages can be sent over five different transport types: Reliable Connected (RC), Reliable Datagram (RD), Unreliable Connected (UC), Unreliable Datagram (UD), and Raw Datagram (RawD). Consumers retrieve the results of these messages from a completion queue (CQ) through SAN send and receive work completion (WC) queues. The source channel adapter takes care of segmenting outbound messages and sending them to the destination. The destination channel adapter takes care of reassembling inbound messages and placing them in the memory space designated by the destination's consumer.

Two channel adapter types are present in nodes of the SAN fabric, a host channel adapter (HCA) and a target channel adapter (TCA). The host channel adapter is used by general purpose computing nodes to access the SAN fabric. Consumers use SAN verbs to access host channel adapter functions. The software that interprets verbs and directly accesses the channel adapter is known as the channel interface (CI).

Target channel adapters (TCA) are used by nodes that are the subject of messages sent from host channel adapters. The target channel adapters serve a similar function as that of the host channel adapters in providing the target node an access point to the SAN fabric.

Thus, with the SAN architecture described above, an Ethernet device driver can communicate with an Ethernet adapter by posting send/receive messages to a Host Channel Adapter (HCA) and retrieve the results of these messages through the HCA's Send and Receive Work Queues. The Ethernet adapter includes a Target Channel Adapter, which is the component that attaches to the SAN. Thus, to attach to a Local Area Network (LAN), such as an Internet Protocol (IP) and Ethernet network, an Ethernet adapter is needed as well as a switch or router that attaches the Ethernet adapter to the IP based LAN.

Often it is beneficial to logically partition a system so as to support a plurality of operating system environments. Such logical partitioning allows each operating system, and applications operating within that operating system environment, to view the resources of the system as being dedicated to that operating system environment even though, in actuality, the resources are shared by a plurality of operating system environments. Such logical partitioning allows a system to support multiple different environments and thus, increases the versatility of the system while reducing the cost of maintaining the different environments by sharing of resources.

While logically partitioning is generally known in the art, logical partitioning has not been applied to a system area network, such as the InfiniBand network architecture. Furthermore, it is not known prior to the present invention, how to implement access control to resources in a system area network that has been logically partitioned so that operating systems and applications cannot access resources that are assigned to other logical partitions. Therefore, it would be beneficial to have an apparatus, system and method for implementing logical partitioning in a system area network, such as the InfiniBand network, in which access to resources associated with a logical partition is controlled.

SUMMARY OF THE INVENTION

The present invention provides an apparatus, system and method for controlling access to facilities based on usage class of a requestor. With the apparatus, system and method of the present invention, a two level protection mechanism is provided for protecting host channel adapter (HCA) facilities from unauthorized access. With the present invention, a first level of access is provided through virtual address translation and a mechanism for determining if the requestor of access may access a system memory address space page associated with a real address to which the virtual address maps. A second level of access is provided through the allocation of usage classes and determining a required usage class for accessing an HCA facility.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 2 is a functional block diagram of a host processor node in accordance with a preferred embodiment of the present invention;

FIG. 3A is a diagram of a host channel adapter in accordance with a preferred embodiment of the present invention;

FIG. 13 is an exemplary diagram of a memory space in accordance with the present invention;

FIG. 14 illustrates an expanded view of the system memory address space pages assigned to an exemplary queue pair according to the present invention;

DETAILED DESCRIPTION OF THE PREFERRED EMBODIMENT

The present invention provides an apparatus, system and method for controlling access to system resources based on usage classes. The preferred embodiments of the present invention will be described in terms of the InfiniBand architecture which is one possible system area network in which the present invention may be used. Therefore, a description of the InfiniBand network will first be provided with regard to FIGS. 1–11.

Figure 1:
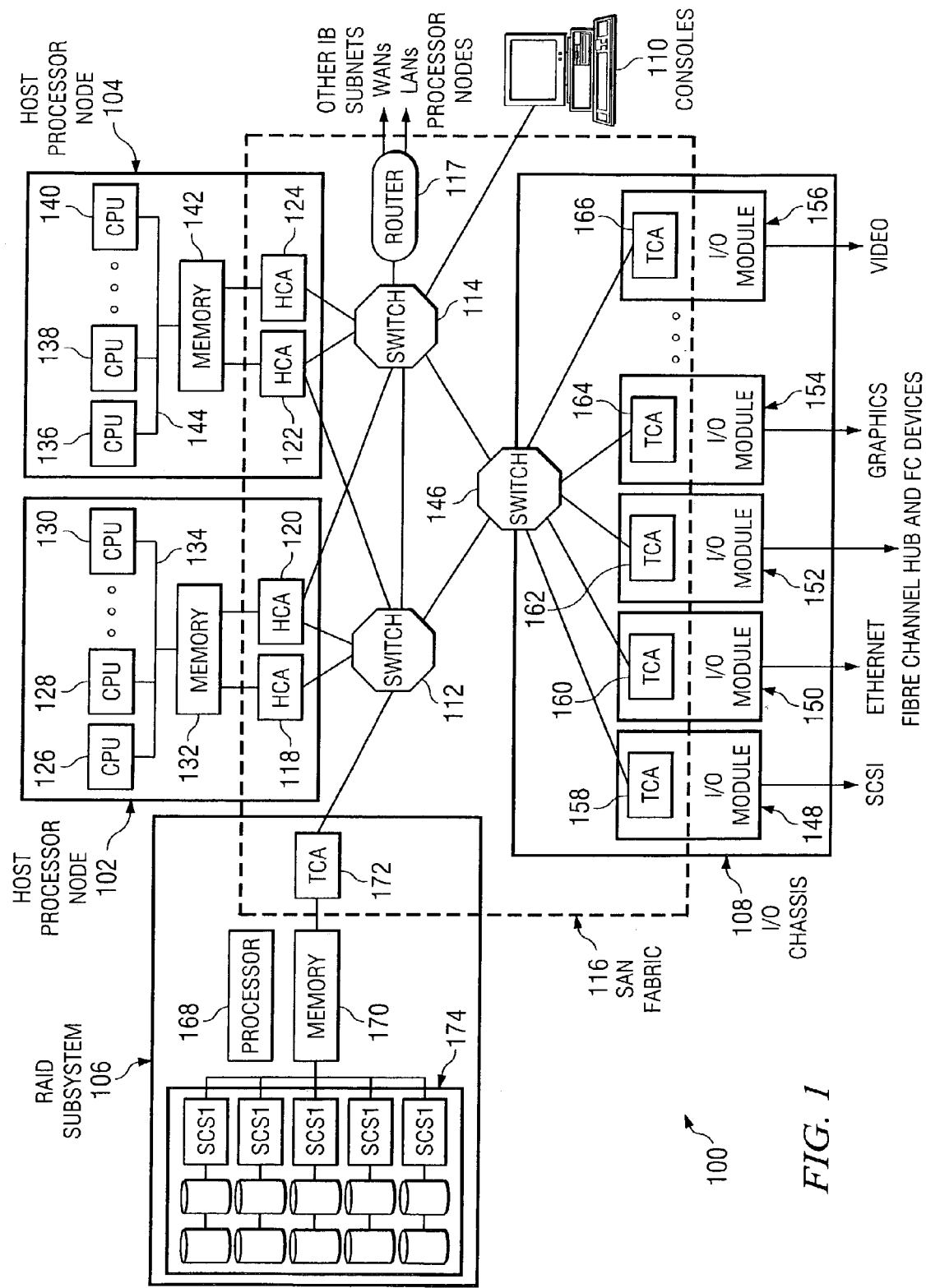
FIG. 1 is a diagram of a distributed computer system is illustrated in accordance with a preferred embodiment of the present invention.

With reference now to the figures and in particular with reference to FIG. 1, a diagram of a distributed computer system is illustrated in accordance with a preferred embodiment of the present invention. The distributed computer system represented in FIG. 1 takes the form of a system area network (SAN) 100 and is provided merely for illustrative purposes, and the embodiments of the present invention described below can be implemented on computer systems of numerous other types and configurations. For example, computer systems implementing the present invention can range from a small server with one processor and a few input/output (I/0) adapters to massively parallel supercomputer systems with hundreds or thousands of processors and thousands of I/O adapters. Furthermore, the present invention can be implemented in an infrastructure of remote computer systems connected by an internet or intranet.

SAN 100 is a high-bandwidth, low-latency network interconnecting nodes within the distributed computer system. A node is any component attached to one or more links of a network and forming the origin and/or destination of messages within the network. In the depicted example, SAN 100 includes nodes in the form of host processor node 102, host processor node 104, redundant array independent disk (RAID) subsystem node 106, and I/O chassis node 108. The nodes illustrated in FIG. 1 are for illustrative purposes only, as SAN 100 can connect any number and any type of independent processor nodes, I/O adapter nodes, and I/O device nodes. Any one of the nodes can function as an endnode, which is herein defined to be a device that originates or finally consumes messages or frames in SAN 100.

In one embodiment of the present invention, an error handling mechanism in distributed computer systems is present in which the error handling mechanism allows for reliable connection or reliable datagram communication between end nodes in distributed computing system, such as SAN 100.

A message, as used herein, is an application-defined unit of data exchange, which is a primitive unit of communication between cooperating processes. A packet is one unit of data encapsulated by networking protocol headers and/or trailers. The headers generally provide control and routing information for directing the frame through SAN. The trailer generally contains control and cyclic redundancy check (CRC) data for ensuring packets are not delivered with corrupted contents.

SAN 100 contains the communications and management infrastructure supporting both I/O and interprocessor communications (IPC) within a distributed computer system. The SAN 100 shown in FIG. 1 includes a switched communications fabric 116, which allows many devices to concurrently transfer data with high-bandwidth and low latency in a secure, remotely managed environment. Endnodes can communicate over multiple ports and utilize multiple paths through the SAN fabric. The multiple ports and paths through the SAN shown in FIG. 1 can be employed for fault tolerance and increased bandwidth data transfers.

The SAN 100 in FIG. 1 includes switch 112, switch 114, switch 146, and router 117. A switch is a device that connects multiple links together and allows routing of packets from one link to another link within a subnet using a small header Destination Local Identifier (DLID) field. A router is a device that connects multiple subnets together and is capable of routing frames from one link in a first subnet to another link in a second subnet using a large header Destination Globally Unique Identifier (DGUID).

In one embodiment, a link is a full duplex channel between any two network fabric elements, such as endnodes, switches, or routers. Example suitable links include, but are not limited to, copper cables, optical cables, and printed circuit copper traces on backplanes and printed circuit boards.

For reliable service types, endnodes, such as host processor endnodes and I/O adapter endnodes, generate request packets and return acknowledgment packets. Switches and routers pass packets along, from the source to the destination. Except for the variant CRC trailer field, which is updated at each stage in the network, switches pass the packets along unmodified. Routers update the variant CRC trailer field and modify other fields in the header as the packet is routed.

In SAN 100 as illustrated in FIG. 1, host processor node 102, host processor node 104, and I/O chassis 108 include at least one channel adapter (CA) to interface to SAN 100. In one embodiment, each channel adapter is an endpoint that implements the channel adapter interface in sufficient detail to source or sink packets transmitted on SAN fabric 100. Host processor node 102 contains channel adapters in the form of host channel adapter 118 and host channel adapter 120. Host processor node 104 contains host channel adapter 122 and host channel adapter 124. Host processor node 102 also includes central processing units 126–130 and a memory 132 interconnected by bus system 134. Host processor node 104 similarly includes central processing units 136–140 and a memory 142 interconnected by a bus system 144.

Host channel adapters 118 and 120 provide a connection to switch 112 while host channel adapters 122 and 124 provide a connection to switches 112 and 114.

In one embodiment, a host channel adapter is implemented in hardware. In this implementation, the host channel adapter hardware offloads much of central processing unit and I/O adapter communication overhead. This hardware implementation of the host channel adapter also permits multiple concurrent communications over a switched network without the traditional overhead associated with communicating protocols.

In one embodiment, the host channel adapters and SAN 100 in FIG. 1 provide the I/O and interprocessor communications (IPC) consumers of the distributed computer system with zero processor-copy data transfers without involving the operating system kernel process, and employs hardware to provide reliable, fault tolerant communications. As indicated in FIG. 1, router 116 is coupled to wide area network (WAN) and/or local area network (LAN) connections to other hosts or other routers.

The I/O chassis 108 in FIG. 1 includes an I/O switch 146 and multiple I/O modules 148–156. In these examples, the I/O modules take the form of adapter cards. Example adapter cards illustrated in FIG. 1 include a SCSI adapter card for I/O module 148; an adapter card to fiber channel hub and fiber channel-arbitrated loop (FC-AL) devices for I/O module 152; an ethernet adapter card for I/O module 150; a graphics adapter card for I/O module 154; and a video adapter card for I/O module 156. Any known type of adapter card can be implemented. I/O adapters also include a switch in the I/O adapter backplane to couple the adapter cards to the SAN fabric. These modules contain target channel adapters 158-166.

In this example, RAID subsystem node 106 in FIG. 1 includes a processor 168, a memory 170, a target channel adapter (TCA) 172, and multiple redundant and/or striped storage disk unit 174. Target channel adapter 172 can be a fully functional host channel adapter.

SAN 100 handles data communications for I/O and interprocessor communications. SAN 100 supports high-bandwidth and scalability required for I/O and also supports the extremely low latency and low CPU overhead required for interprocessor communications. User clients can bypass the operating system kernel process and directly access network communication hardware, such as host channel adapters, which enable efficient message passing protocols. SAN 100 is suited to current computing models and is a building block for new forms of I/O and computer cluster communication. Further, SAN 100 in FIG. 1 allows I/O adapter nodes to communicate among themselves or communicate with any or all of the processor nodes in distributed computer system. With an I/O adapter attached to the SAN 100, the resulting I/O adapter node has substantially the same communication capability as any host processor node in SAN 100.

In one embodiment, the SAN 100 shown in FIG. 1 supports channel semantics and memory semantics. Channel semantics is sometimes referred to as send/receive or push communication operations. Channel semantics are the type of communications employed in a traditional I/O channel where a source device pushes data and a destination device determines a final destination of the data. In channel semantics, the packet transmitted from a source process specifies a destination processes' communication port, but does not specify where in the destination processes' memory space the packet will be written. Thus, in channel semantics, the destination process pre-allocates where to place the transmitted data.

In memory semantics, a source process directly reads or writes the virtual address space of a remote node destination process. The remote destination process need only communicate the location of a buffer for data, and does not need to be involved in the transfer of any data. Thus, in memory semantics, a source process sends a data packet containing the destination buffer memory address of the destination process. In memory semantics, the destination process previously grants permission for the source process to access its memory.

Channel semantics and memory semantics are typically both necessary for I/O and interprocessor communications. A typical I/O operation employs a combination of channel and memory semantics. In an illustrative example I/O operation of the distributed computer system shown in FIG. 1, a host processor node, such as host processor node 102, initiates an I/O operation by using channel semantics to send a disk write command to a disk I/O adapter, such as RAID subsystem target channel adapter (TCA) 172. The disk I/O adapter examines the command and uses memory semantics to read the data buffer directly from the memory space of the host processor node. After the data buffer is read, the disk I/O adapter employs channel semantics to push an I/O completion message back to the host processor node.

In one exemplary embodiment, the distributed computer system shown in FIG. 1 performs operations that employ virtual addresses and virtual memory protection mechanisms to ensure correct and proper access to all memory. Applications running in such a distributed computed system are not required to use physical addressing for any operations.

Turning next to FIG. 2, a functional block diagram of a host processor node is depicted in accordance with a preferred embodiment of the present invention. Host processor node 200 is an example of a host processor node, such as host processor node 102 in FIG. 1.

In this example, host processor node 200 shown in FIG. 2 includes a set of consumers 202–208, which are processes executing on host processor node 200. Host processor node 200 also includes channel adapter 210 and channel adapter 212. Channel adapter 210 contains ports 214 and 216 while channel adapter 212 contains ports 218 and 220. Each port connects to a link. The ports can connect to one SAN subnet or multiple SAN subnets, such as SAN 100 in FIG. 1. In these examples, the channel adapters take the form of host channel adapters.

Consumers 202–208 transfer messages to the SAN via the verbs interface 222 and message and data service 224. A verbs interface is essentially an abstract description of the functionality of a host channel adapter. An operating system may expose some or all of the verb functionality through its programming interface. Basically, this interface defines the behavior of the host. Additionally, host processor node 200 includes a message and data service 224, which is a higher-level interface than the verb layer and is used to process messages and data received through channel adapter 210 and channel adapter 212. Message and data service 224 provides an interface to consumers 202–208 to process messages and other data.

With reference now to FIG. 3A, a diagram of a host channel adapter is depicted in accordance with a preferred embodiment of the present invention. Host channel adapter 300A shown in FIG. 3A includes a set of queue pairs (QPs)

302A–310A, which are used to transfer messages to the host channel adapter ports 312A–316A. Buffering of data to host channel adapter ports 312A–316A is channeled through virtual lanes (VL) 318A–334A where each VL has its own flow control. Subnet manager configures channel adapters with the local addresses for each physical port, i.e., the port's LID.

Subnet manager agent (SMA) 336A is the entity that communicates with the subnet manager for the purpose of configuring the channel adapter. Memory translation and protection (MTP) 338A is a mechanism that translates virtual addresses to physical addresses and validates access rights. Direct memory access (DMA) 340A provides for direct memory access operations using memory 340A with respect to queue pairs 302A–310A.

A single channel adapter, such as the host channel adapter 300A shown in FIG. 3A, can support thousands of queue pairs. By contrast, a target channel adapter in an I/O adapter typically supports a much smaller number of queue pairs. Each queue pair consists of a send work queue (SWQ) and a receive work queue. The send work queue is used to send channel and memory semantic messages. The receive work queue receives channel and semantic messages. A consumer calls an operating-system specific programming interface, which is herein referred to as verbs, to place work requests (WRs) onto a work queue.

Figure 3B:
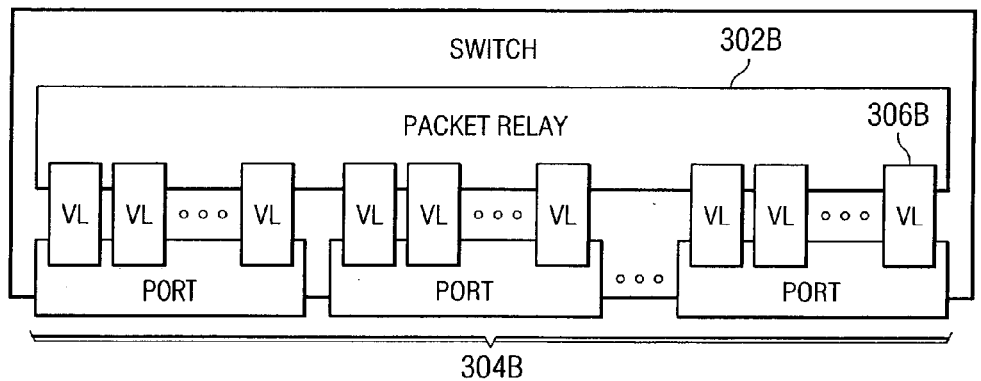
FIG. 3B is a diagram of a switch in accordance with a preferred embodiment of the present invention.

FIG. 3B depicts a switch 300B in accordance with a preferred embodiment of the present invention. Switch 300B includes a packet relay 302B in communication with a number of ports 304B through virtual lanes such as virtual lane 306B. Generally, a switch such as switch 300B can route packets from one port to any other port on the same switch.

Figure 3C:
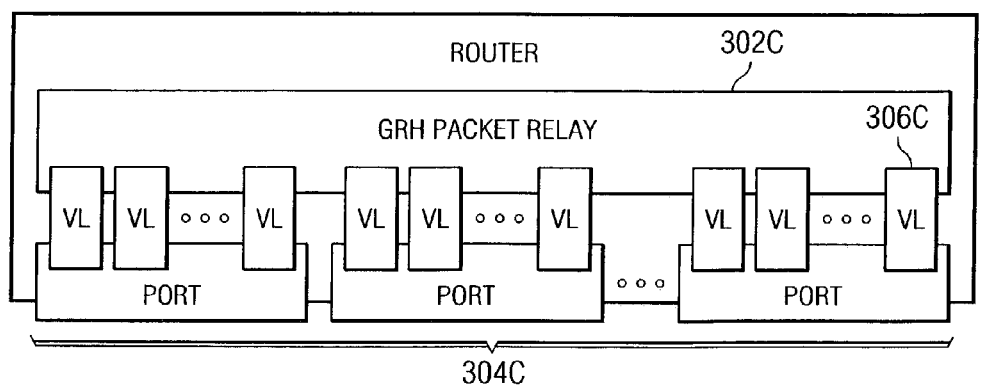
FIG. 3C is a diagram of a router in accordance with a preferred embodiment of the present invention.

Similarly, FIG. 3C depicts a router 300C according to a preferred embodiment of the present invention. Router 300C includes a packet relay 302C in communication with a number of ports 304C through virtual lanes such as virtual lane 306C. Like switch 300B, router 300C will generally be able to route packets from one port to any other port on the same router.

Channel adapters, switches, and routers employ multiple virtual lanes within a single physical link. As illustrated in FIGS. 3A, 3B, and 3C, physical ports connect endnodes, switches, and routers to a subnet. Packets injected into the SAN fabric follow one or more virtual lanes from the packet's source to the packet's destination. The virtual lane that is selected is mapped from a service level associated with the packet. At any one time, only one virtual lane makes progress on a given physical link. Virtual lanes provide a technique for applying link level flow control to one virtual lane without affecting the other virtual lanes. When a packet on one virtual lane blocks due to contention, quality of service (QoS), or other considerations, a packet on a different virtual lane is allowed to make progress.

Virtual lanes are employed for numerous reasons, some of which are as follows: Virtual lanes provide QoS. In one example embodiment, certain virtual lanes are reserved for high priority or isochronous traffic to provide QoS.

Virtual lanes provide deadlock avoidance. Virtual lanes allow topologies that contain loops to send packets across all physical links and still be assured the loops won't cause back pressure dependencies that might result in deadlock.

Virtual lanes alleviate head-of-line blocking. When a switch has no more credits available for packets that utilize a given virtual lane, packets utilizing a different virtual lane that has sufficient credits are allowed to make forward progress.

Figure 4:
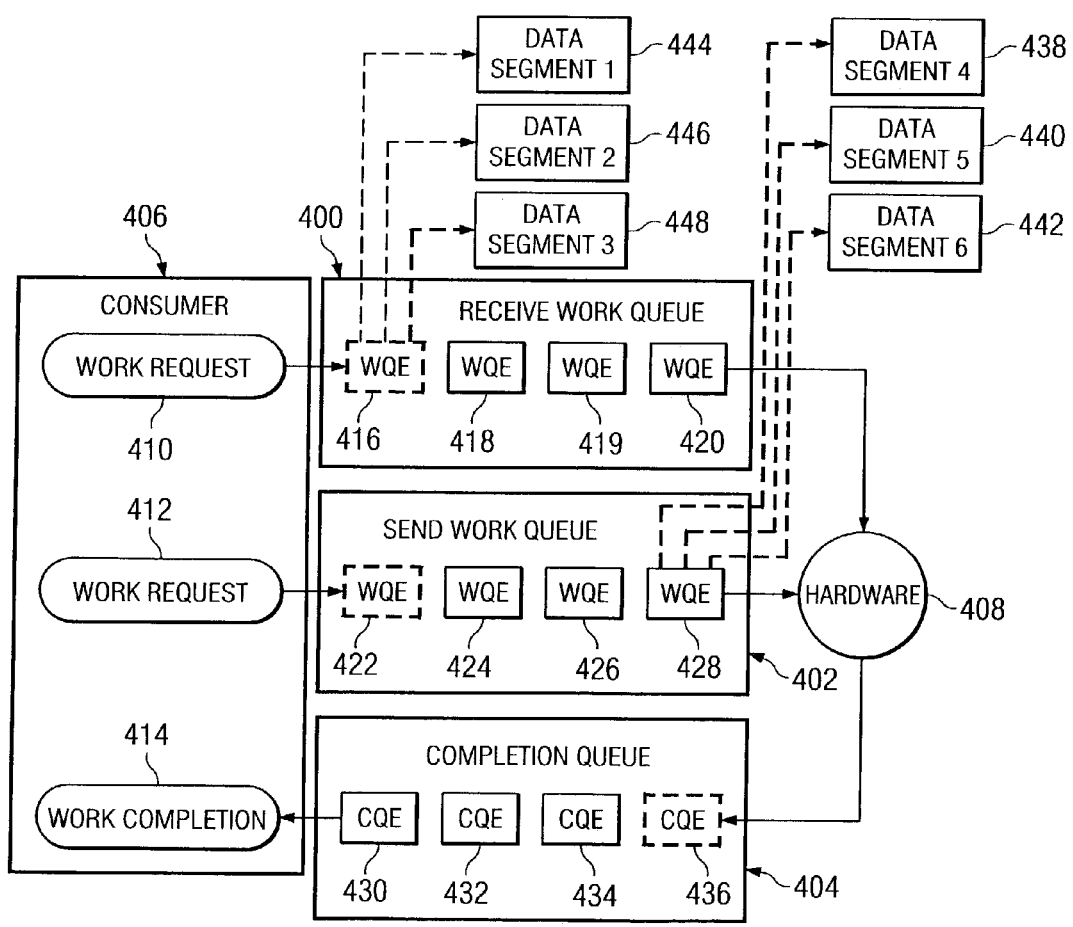
FIG. 4 is a diagram illustrating processing of work requests in accordance with a preferred embodiment of the present invention.

With reference now to FIG. 4, a diagram illustrating processing of work requests is depicted in accordance with a preferred embodiment of the present invention. In FIG. 4, a receive work queue 400, send work queue 402, and completion queue 404 are present for processing requests from and for consumer 406. These requests from consumer are eventually sent to hardware 408. In this example, consumer 406 generates work requests 410 and 412 and receives work completion 414. As shown in FIG. 4, work requests placed onto a work queue are referred to as work queue elements (WQEs).

Send work queue 402 contains work queue elements (WQEs) 422–428, describing data to be transmitted on the SAN fabric. Receive work queue 400 contains work queue elements (WQEs) 416–420, describing where to place incoming channel semantic data from the SAN fabric. A work queue element is processed by hardware 408 in the host channel adapter.

The verbs also provide a mechanism for retrieving completed work from completion queue 404. As shown in FIG. 4, completion queue 404 contains completion queue elements (CQEs) 430–436. Completion queue elements contain information about previously completed work queue elements. Completion queue 404 is used to create a single point of completion notification for multiple queue pairs. A completion queue element is a data structure on a completion queue. This element describes a completed work queue element. The completion queue element contains sufficient information to determine the queue pair and specific work queue element that completed. A completion queue context is a block of information that contains pointers to, length, and other information needed to manage the individual completion queues.

Example work requests supported for the send work queue 402 shown in FIG. 4 are as follows. A send work request is a channel semantic operation to push a set of local data segments to the data segments referenced by a remote node's receive work queue element. For example, work queue element 428 contains references to data segment 4 438, data segment 5 440, and data segment 6 442. Each of the send work request's data segments contains a virtually contiguous memory region. The virtual addresses used to reference the local data segments are in the address context of the process that created the local queue pair.

A remote direct memory access (RDMA) read work request provides a memory semantic operation to read a virtually contiguous memory space on a remote node. A memory space can either be a portion of a memory region or portion of a memory window. A memory region references a previously registered set of virtually contiguous memory addresses defined by a virtual address and length. A memory window references a set of virtually contiguous memory addresses that have been bound to a previously registered region.

The RDMA Read work request reads a virtually contiguous memory space on a remote endnode and writes the data to a virtually contiguous local memory space. Similar to the send work request, virtual addresses used by the RDMA Read work queue element to reference the local data segments are in the address context of the process that created the local queue pair. For example, work queue element 416 in receive work queue 400 references data segment 1 444, data segment 2 446, and data segment 448. The remote virtual addresses are in the address context of the process owning the remote queue pair targeted by the RDMA Read work queue element.

A RDMA Write work queue element provides a memory semantic operation to write a virtually contiguous memory space on a remote node. The RDMA Write work queue element contains a scatter list of local virtually contiguous memory spaces and the virtual address of the remote memory space into which the local memory spaces are written.

A RDMA FetchOp work queue element provides a memory semantic operation to perform an atomic operation on a remote word. The RDMA FetchOp work queue element is a combined RDMA Read, Modify, and RDMA Write operation. The RDMA FetchOp work queue element can support several read-modify-write operations, such as Compare and Swap if equal.

A bind (unbind) remote access key ($R_{13}$ Key) work queue element provides a command to the host channel adapter hardware to modify (destroy) a memory window by associating (disassociating) the memory window to a memory region. The $R_{13}$ Key is part of each RDMA access and is used to validate that the remote process has permitted access to the buffer.

In one embodiment, receive work queue 400 shown in FIG. 4 only supports one type of work queue element, which is referred to as a receive work queue element. The receive work queue element provides a channel semantic operation describing a local memory space into which incoming send messages are written. The receive work queue element includes a scatter list describing several virtually contiguous memory spaces. An incoming send message is written to these memory spaces. The virtual addresses are in the address context of the process that created the local queue pair.

For interprocessor communications, a user-mode software process transfers data through queue pairs directly from where the buffer resides in memory. In one embodiment, the transfer through the queue pairs bypasses the operating system and consumes few host instruction cycles. Queue pairs permit zero processor-copy data transfer with no operating system kernel involvement. The zero processor-copy data transfer provides for efficient support of high-bandwidth and low-latency communication.

When a queue pair is created, the queue pair is set to provide a selected type of transport service. In one embodiment, a distributed computer system implementing the present invention supports four types of transport services: reliable, unreliable, reliable datagram, and unreliable datagram connection service.

Reliable and Unreliable connected services associate a local queue pair with one and only one remote queue pair. Connected services require a process to create a queue pair for each process that is to communicate with over the SAN fabric. Thus, if each of N host processor nodes contain P processes, and all P processes on each node wish to communicate with all the processes on all the other nodes, each host processor node requires $P^2 \times (N-1)$ queue pairs. Moreover, a process can connect a queue pair to another queue pair on the same host channel adapter.

Figure 5:
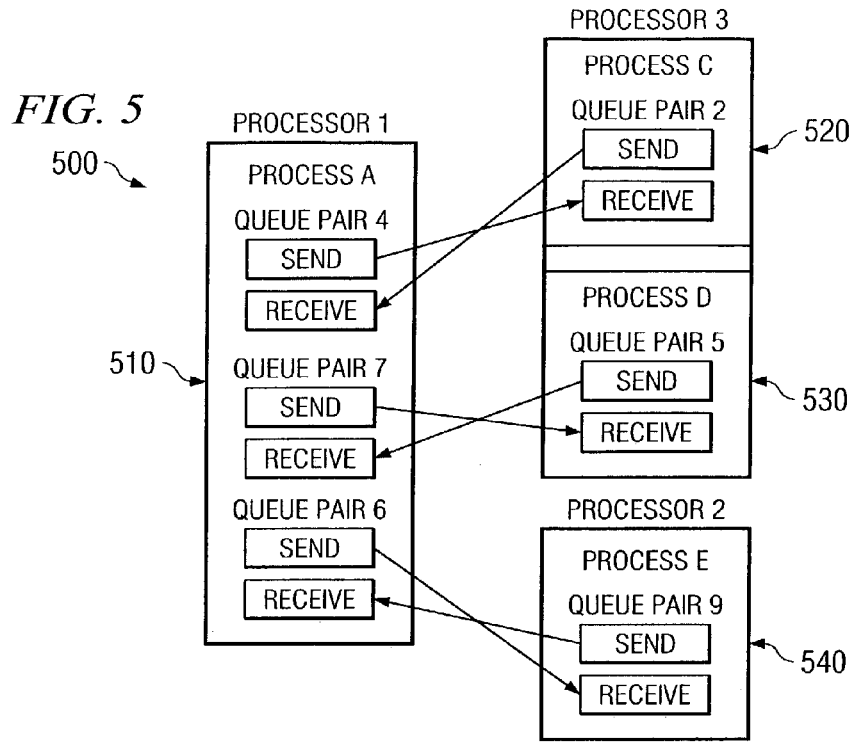
FIG. 5 is a diagram illustrating a portion of a distributed computer system in accordance with a preferred embodiment of the present invention in which a reliable connection service is used.

A portion of a distributed computer system employing a reliable connection service to communicate between distributed processes is illustrated generally in FIG. 5. The distributed computer system 500 in FIG. 5 includes a host processor node 1, a host processor node 2, and a host processor node 3. Host processor node 1 includes a process A 510. Host processor node 2 includes a process C 520 and a process D 530. Host processor node 3 includes a process E 540.

Host processor node 1 includes queue pairs 4, 6 and 7, each having a send work queue and receive work queue. Host processor node 2 has a queue pair 9 and host processor node 3 has queue pairs 2 and 5. The reliable connection service of distributed computer system 500 associates a local queue pair with one an only one remote queue pair. Thus, the queue pair 4 is used to communicate with queue pair 2; queue pair 7 is used to communicate with queue pair 5; and queue pair 6 is used to communicate with queue pair 9.

A WQE placed on one queue pair in a reliable connection service causes data to be written into the receive memory space referenced by a Receive WQE of the connected queue pair. RDMA operations operate on the address space of the connected queue pair.

In one embodiment of the present invention, the reliable connection service is made reliable because hardware maintains sequence numbers and acknowledges all packet transfers. A combination of hardware and SAN driver software retries any failed communications. The process client of the queue pair obtains reliable communications even in the presence of bit errors, receive underruns, and network congestion. If alternative paths exist in the SAN fabric, reliable communications can be maintained even in the presence of failures of fabric switches, links, or channel adapter ports.

In addition, acknowledgments may be employed to deliver data reliably across the SAN fabric. The acknowledgment may, or may not, be a process level acknowledgment, i.e. an acknowledgment that validates that a receiving process has consumed the data. Alternatively, the acknowledgment may be one that only indicates that the data has reached its destination.

Reliable datagram service associates a local end-to-end (EE) context with one and only one remote end-to-end context. The reliable datagram service permits a client process of one queue pair to communicate with any other queue pair on any other remote node. At a receive work queue, the reliable datagram service permits incoming messages from any send work queue on any other remote node.

The reliable datagram service greatly improves scalability because the reliable datagram service is connectionless. Therefore, an endnode with a fixed number of queue pairs can communicate with far more processes and endnodes with a reliable datagram service than with a reliable connection transport service. For example, if each of N host processor nodes contain P processes, and all P processes on each node wish to communicate with all the processes on all the other nodes, the reliable connection service requires $P^2 \times (N-1)$ queue pairs on each node. By comparison, the connectionless reliable datagram service only requires P queue pairs+(N-1) EE contexts on each node for exactly the same communications.

Figure 6:
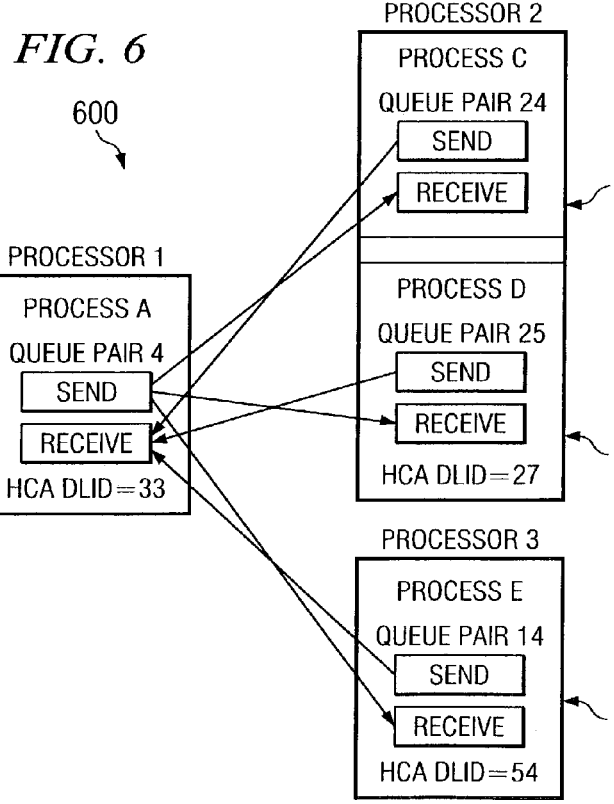
FIG. 6 is a diagram illustrating a portion of a distributed computer system in accordance with a preferred embodiment of the present invention in which reliable datagram service connections are used.

A portion of a distributed computer system employing a reliable datagram service to communicate between distributed processes is illustrated in FIG. 6. The distributed computer system 600 in FIG. 6 includes a host processor node 1, a host processor node 2, and a host processor node 3. Host processor node 1 includes a process A 610 having a queue pair 4. Host processor node 2 has a process C 620 having a queue pair 24 and a process D 630 having a queue pair 25. Host processor node 3 has a process E 640 having a queue pair 14.

In the reliable datagram service implemented in the distributed computer system 600, the queue pairs are coupled in what is referred to as a connectionless transport service. For example, a reliable datagram service couples queue pair 4 to queue pairs 24, 25 and 14. Specifically, a reliable datagram service allows queue pair 4's send work queue to reliably transfer messages to receive work queues in queue pairs 24, 25 and 14. Similarly, the send queues of queue pairs 24, 25, and 14 can reliably transfer messages to the receive work queue in queue pair 4.

In one embodiment of the present invention, the reliable datagram service employs sequence numbers and acknowledgments associated with each message frame to ensure the same degree of reliability as the reliable connection service. End-to-end (EE) contexts maintain end-to-end specific state to keep track of sequence numbers, acknowledgments, and time-out values. The end-to-end state held in the EE contexts is shared by all the connectionless queue pairs communication between a pair of endnodes. Each endnode requires at least one EE context for every endnode it wishes to communicate with in the reliable datagram service (e.g., a given endnode requires at least N EE contexts to be able to have reliable datagram service with N other endnodes).

The unreliable datagram service is connectionless. The unreliable datagram service is employed by management applications to discover and integrate new switches, routers, and endnodes into a given distributed computer system. The unreliable datagram service does not provide the reliability guarantees of the reliable connection service and the reliable datagram service. The unreliable datagram service accordingly operates with less state information maintained at each endnode.

Figure 7:
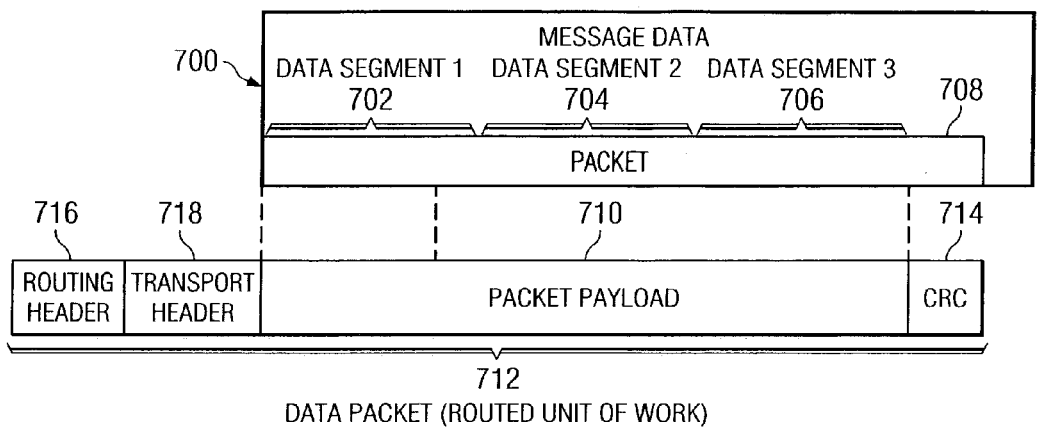
FIG. 7 is an illustration of a data packet in accordance with a preferred embodiment of the present invention.

Turning next to FIG. 7, an illustration of a data packet is depicted in accordance with a preferred embodiment of the present invention. A data packet is a unit of information that is routed through the SAN fabric. The data packet is an endnode-to-endnode construct, and is thus created and consumed by endnodes. For packets destined to a channel adapter (either host or target), the data packets are neither generated nor consumed by the switches and routers in the SAN fabric. Instead for data packets that are destined to a channel adapter, switches and routers simply move request packets or acknowledgment packets closer to the ultimate destination, modifying the variant link header fields in the process. Routers, also modify the packet's network header when the packet crosses a subnet boundary. In traversing a subnet, a single packet stays on a single service level.

Message data 700 contains data segment 1 702, data segment 2 704, and data segment 3 706, which are similar to the data segments illustrated in FIG. 4. In this example, these data segments form a packet 708, which is placed into packet payload 710 within data packet 712. Additionally, data packet 712 contains CRC 714, which is used for error checking. Additionally, routing header 716 and transport 718 are present in data packet 712. Routing header 716 is used to identify source and destination ports for data packet 712. Transport header 718 in this example specifies the destination queue pair for data packet 712. Additionally, transport header 718 also provides information such as the operation code, packet sequence number, and partition for data packet 712.

The operating code identifies whether the packet is the first, last, intermediate, or only packet of a message. The operation code also specifies whether the operation is a send RDMA write, read, or atomic. The packet sequence number is initialized when communication is established and increments each time a queue pair creates a new packet. Ports of an endnode may be configured to be members of one or more possibly overlapping sets called partitions.

Figure 8:
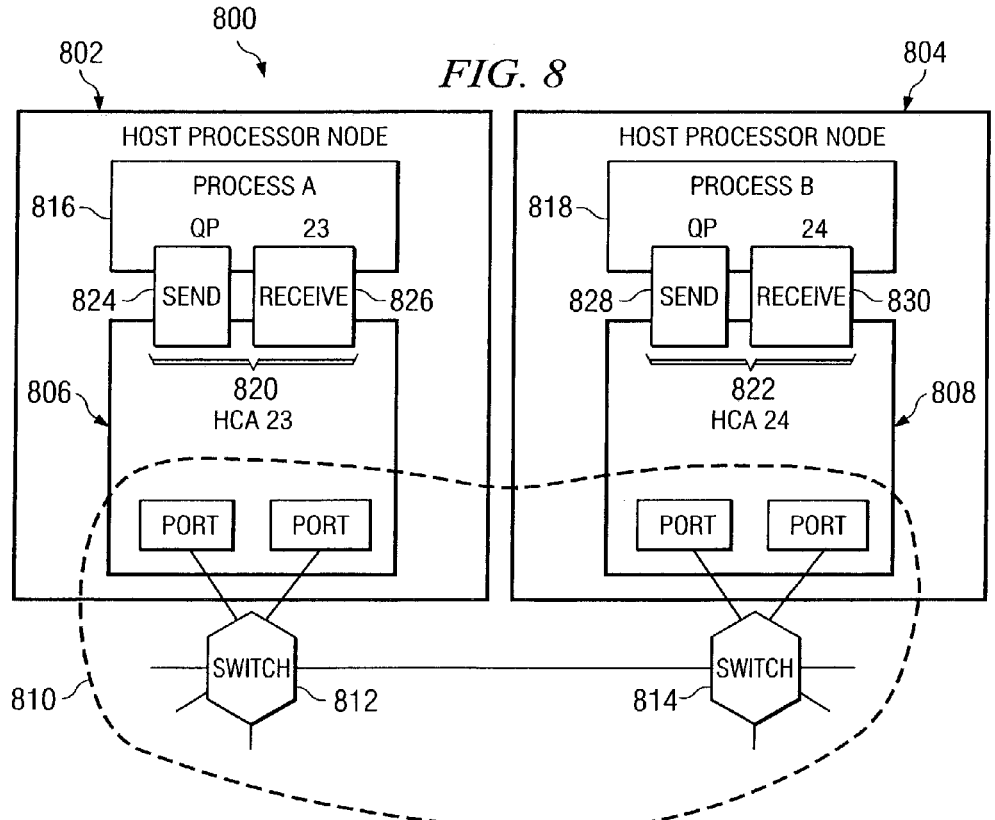
FIG. 8 is a diagram illustrating a portion of a distributed computer system in accordance with a preferred embodiment of the present invention.

In FIG. 8, a portion of a distributed computer system is depicted to illustrate an example request and acknowledgment transaction. The distributed computer system in FIG. 8 includes a host processor node 802 and a host processor node 804. Host processor node 802 includes a host channel adapter 806. Host processor node 804 includes a host channel adapter 808. The distributed computer system in FIG. 8 includes a SAN fabric 810, which includes a switch 812 and a switch 814. The SAN fabric includes a link coupling host channel adapter 806 to switch 812; a link coupling switch 812 to switch 814; and a link coupling host channel adapter 808 to switch 814.

In the example transactions, host processor node 802 includes a client process A. Host processor node 804 includes a client process B. Client process A interacts with host channel adapter hardware 806 through queue pair 824. Client process B interacts with hardware channel adapter hardware 808 through queue pair 828. Queue pairs 824 and 828 are data structures that include a send work queue and a receive work queue.

Process A initiates a message request by posting work queue elements to the send queue of queue pair 824. Such a work queue element is illustrated in FIG. 4. The message request of client process A is referenced by a gather list contained in the send work queue element. Each data segment in the gather list points to a virtually contiguous local memory region, which contains a part of the message, such as indicated by data segments 1, 2, and 3, which respectively hold message parts 1, 2, and 3, in FIG. 4.

Hardware in host channel adapter 806 reads the work queue element and segments the message stored in virtual contiguous buffers into data packets, such as the data packet illustrated in FIG. 7. Data packets are routed through the SAN fabric, and for reliable transfer services, are acknowledged by the final destination endnode. If not successively acknowledged, the data packet is retransmitted by the source endnode. Data packets are generated by source endnodes and consumed by destination endnodes.

Figure 9:
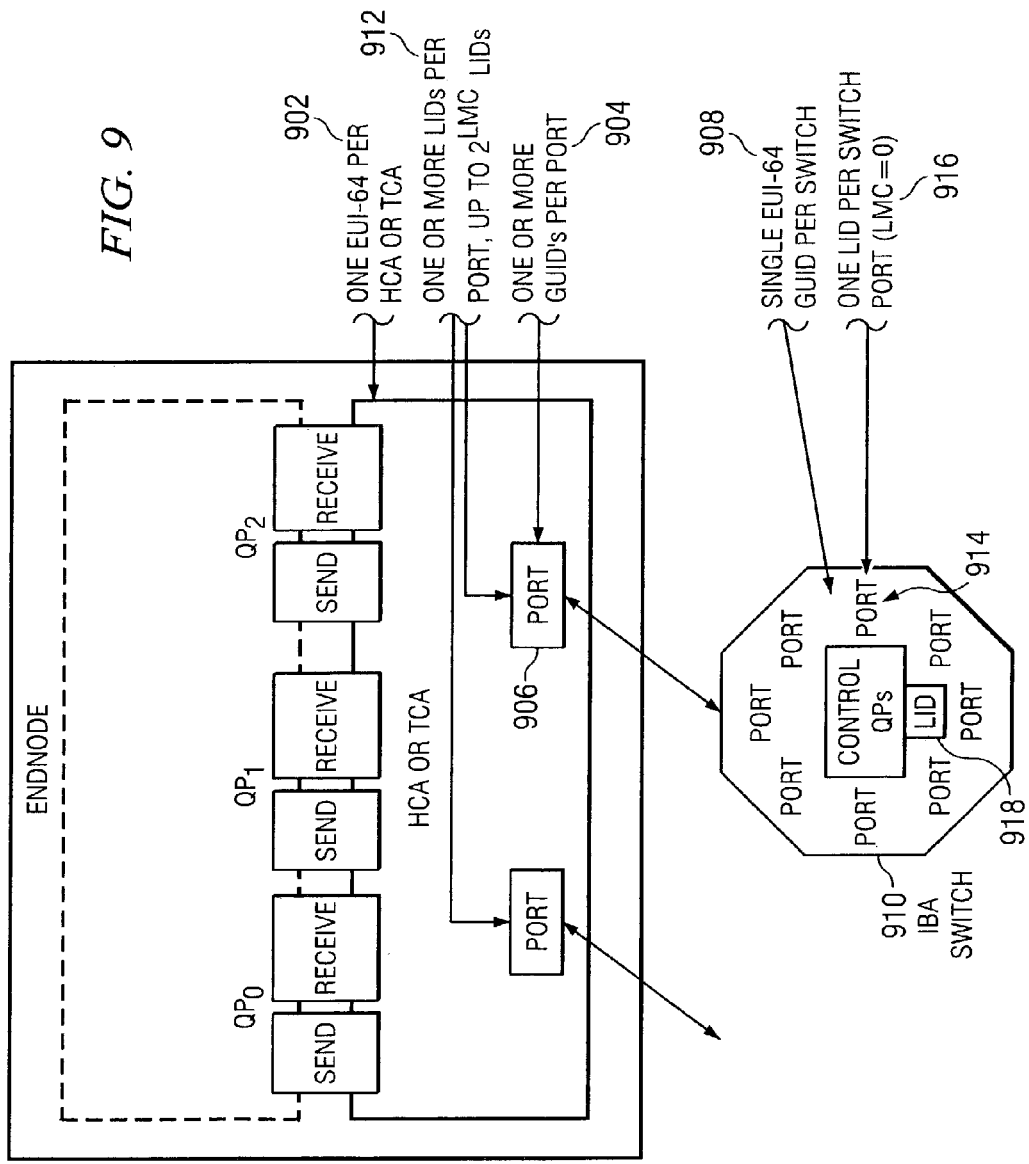
FIG. 9 is a diagram illustrating the network addressing used in a distributed networking system in accordance with the present invention.

In reference to FIG. 9, a diagram illustrating the network addressing used in a distributed networking system is depicted in accordance with the present invention. A host name provides a logical identification for a host node, such as a host processor node or I/O adapter node. The host name identifies the endpoint for messages such that messages are destined for processes residing on an end node specified by the host name. Thus, there is one host name per node, but a node can have multiple CAs.

A single IEEE assigned 64-bit identifier (EUI-64) 902 is assigned to each component. A component can be a switch, router, or CA.

One or more globally unique ID (GUID) identifiers 904 are assigned per CA port 906. Multiple GUIDs (a.k.a. IP addresses) can be used for several reasons, some of which are illustrated by the following examples. In one embodiment, different IP addresses identify different partitions or services on an end node. In a different embodiment, different IP addresses are used to specify different Quality of Service (QoS) attributes. In yet another embodiment, different IP addresses identify different paths through intra-subnet routes. One GUID 908 is assigned to a switch 910.

A local ID (LID) refers to a short address ID used to identify a CA port within a single subnet. In one example embodiment, a subnet has up to $2^{16}$ end nodes, switches, and routers, and the LID is accordingly 16 bits. A source LID (SLID) and a destination LID (DLID) are the source and destination LIDs used in a local network header. A single CA port 906 has up to $2^{LMC}$ LIDs 912 assigned to it. The LMC represents the LID Mask Control field in the CA. A mask is a pattern of bits used to accept or reject bit patterns in another set of data.

Multiple LIDs can be used for several reasons some of which are provided by the following examples. In one embodiment, different LIDs identify different partitions or services in an end node. In another embodiment, different LIDs are used to specify different QoS attributes. In yet a further embodiment, different LIDs specify different paths through the subnet. Each switch 910 has one LID 918 associated with it.

A one-to-one correspondence does not necessarily exist between LIDs and GUIDs, because a CA can have more or less LIDs than GUIDs for each port. For CAs with redundant ports and redundant conductivity to multiple SAN fabrics, the CAs can, but are not required to, use the same LID and GUID on each of its ports.

Figure 10:
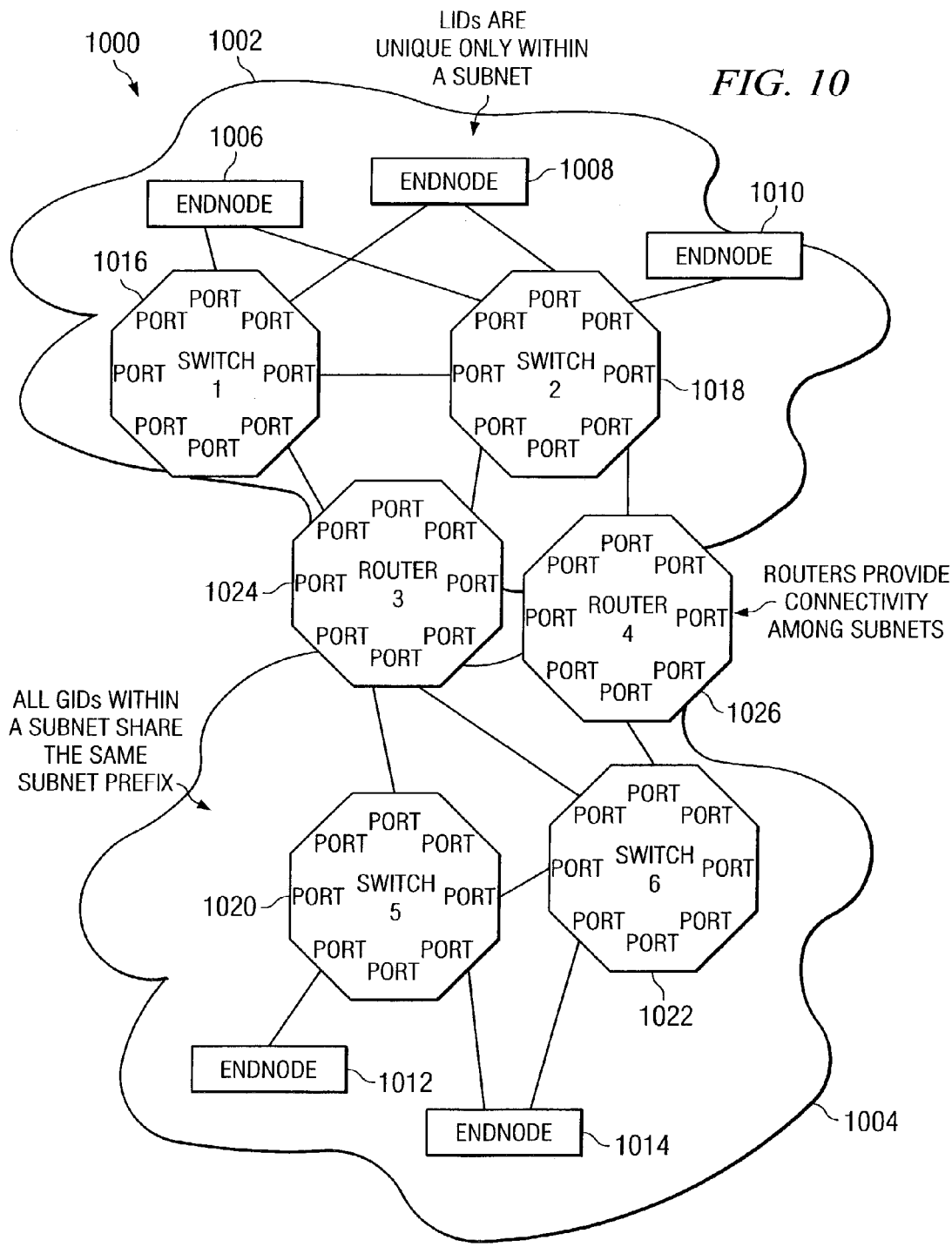
FIG. 10 is a diagram illustrating a portion of a distributed computing system in accordance with a preferred embodiment of the present invention in which the structure of SAN fabric subnets is illustrated.

A portion of a distributed computer system in accordance with a preferred embodiment of the present invention is illustrated in FIG. 10. Distributed computer system 1000 includes a subnet 1002 and a subnet 1004. Subnet 1002 includes host processor nodes 1006, 1008, and 1010. Subnet 1004 includes host processor nodes 1012 and 1014. Subnet 1002 includes switches 1016 and 1018. Subnet 1004 includes switches 1020 and 1022.

Routers connect subnets. For example, subnet 1002 is connected to subnet 1004 with routers 1024 and 1026. In one example embodiment, a subnet has up to 216 endnodes, switches, and routers.

A subnet is defined as a group of endnodes and cascaded switches that is managed as a single unit. Typically, a subnet occupies a single geographic or functional area. For example, a single computer system in one room could be defined as a subnet. In one embodiment, the switches in a subnet can perform very fast wormhole or cut-through routing for messages.

A switch within a subnet examines the DLID that is unique within the subnet to permit the switch to quickly and efficiently route incoming message packets. In one embodiment, the switch is a relatively simple circuit, and is typically implemented as a single integrated circuit. A subnet can have hundreds to thousands of endnodes formed by cascaded switches.

As illustrated in FIG. 10, for expansion to much larger systems, subnets are connected with routers, such as routers 1024 and 1026. The router interprets the IP destination ID (e.g., IPv6 destination ID) and routes the IP-like packet.

An example embodiment of a switch is illustrated generally in FIG. 3B. Each I/O path on a switch or router has a port. Generally, a switch can route packets from one port to any other port on the same switch.

Within a subnet, such as subnet 1002 or subnet 1004, a path from a source port to a destination port is determined by the LID of the destination host channel adapter port. Between subnets, a path is determined by the IP address (e.g., IPv6 address) of the destination host channel adapter port and by the LID address of the router port which will be used to reach the destination's subnet.

In one embodiment, the paths used by the request packet and the request packet's corresponding positive acknowledgment (ACK) or negative acknowledgment (NAK) frame are not required to be symmetric. In one embodiment employing oblivious routing, switches select an output port based on the DLID. In one embodiment, a switch uses one set of routing decision criteria for all its input ports. In one example embodiment, the routing decision criteria are contained in one routing table. In an alternative embodiment, a switch employs a separate set of criteria for each input port. A data transaction in the distributed computer system of the present invention is typically composed of several hardware and software steps. A client process data transport service can be a user-mode or a kernel-mode process. The client process accesses host channel adapter hardware through one or more queue pairs, such as the queue pairs illustrated in FIGS. 3A, 5, and 6. The client process calls an operating-system specific programming interface, which is herein referred to as "verbs." The software code implementing verbs posts a work queue element to the given queue pair work queue.

There are many possible methods of posting a work queue element and there are many possible work queue element formats, which allow for various cost/performance design points, but which do not affect interoperability. A user process, however, must communicate to verbs in a well-defined manner, and the format and protocols of data transmitted across the SAN fabric must be sufficiently specified to allow devices to interoperate in a heterogeneous vendor environment.

In one embodiment, channel adapter hardware detects work queue element postings and accesses the work queue element. In this embodiment, the channel adapter hardware translates and validates the work queue element's virtual addresses and accesses the data.

An outgoing message is split into one or more data packets. In one embodiment, the channel adapter hardware adds a transport header and a network header to each packet. The transport header includes sequence numbers and other transport information. The network header includes routing information, such as the destination IP address and other network routing information. The link header contains the Destination Local Identifier (DLID) or other local routing information. The appropriate link header is always added to the packet. The appropriate global network header is added to a given packet if the destination endnode resides on a remote subnet.

If a reliable transport service is employed, when a request data packet reaches its destination endnode, acknowledgment data packets are used by the destination endnode to let the request data packet sender know the request data packet was validated and accepted at the destination. Acknowledgment data packets acknowledge one or more valid and accepted request data packets. The requestor can have multiple outstanding request data packets before it receives any acknowledgments. In one embodiment, the number of multiple outstanding messages, i.e. Request data packets, is determined when a queue pair is created.

Figure 11:
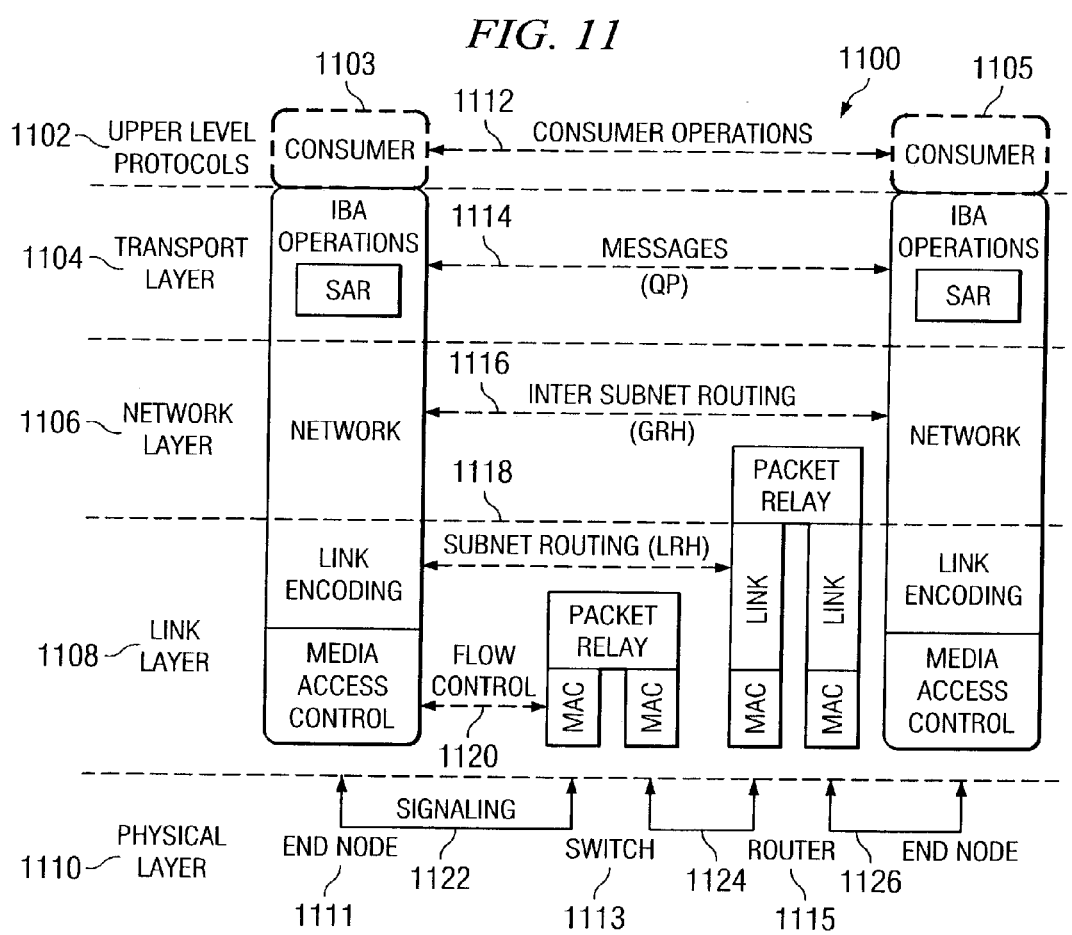
FIG. 11 is a diagram of a layered communication architecture used in a preferred embodiment of the present invention.

One embodiment of a layered architecture 1100 for implementing the present invention is generally illustrated in diagram form in FIG. 11. The layered architecture diagram of FIG. 11 shows the various layers of data communication paths, and organization of data and control information passed between layers.

Host channel adaptor endnode protocol layers (employed by endnode 1111, for instance) include an upper level protocol 1102 defined by consumer 1103, a transport layer 1104; a network layer 1106, a link layer 1108, and a physical layer 1110. Switch layers (employed by switch 1113, for instance) include link layer 1108 and physical layer 1110. Router layers (employed by router 1115, for instance) include network layer 1106, link layer 1108, and physical layer 1110.

Layered architecture 1100 generally follows an outline of a classical communication stack. With respect to the protocol layers of end node 1111, for example, upper layer protocol 1102 employs verbs (1112) to create messages at transport layer 1104. Transport layer 1104 passes messages (1114) to network layer 1106. Network layer 1106 routes packets between network subnets (1116). Link layer 1108 routes packets within a network subnet (1118). Physical layer 1110 sends bits or groups of bits to the physical layers of other devices. Each of the layers is unaware of how the upper or lower layers perform their functionality.

Consumers 1103 and 1105 represent applications or processes that employ the other layers for communicating between endnodes. Transport layer 1104 provides end-to-end message movement. In one embodiment, the transport layer provides three types of transport services as described above which are reliable connection service; reliable datagram service; and unreliable datagram service. Network layer 1106 performs packet routing through a subnet or multiple subnets to destination endnodes. Link layer 1108 performs flow-controlled, error checked, and prioritized packet delivery across links.

Physical layer 1110 performs technology-dependent bit transmission. Bits or groups of bits are passed between physical layers via links 1122, 1124, and 1126. Links can be implemented with printed circuit copper traces, copper cable, optical cable, or with other suitable links.

As previously mentioned, the present invention is directed to an improved apparatus, system and method for use with a system area network, such as an InfiniBand network, in which logical partitioning is supported by host channel adapters (HCAs) of the system area network. With the logical partitioning support for HCAs provided by the present invention, multiple operating systems may share the resources of a single physical HCA. Logical partitioning ensures that each operating system is unaware that the HCA hardware resources are being shared with other operating systems and further guarantees that the individual operating systems and applications of a particular partition are prevented from accessing HCA hardware resources which are associated with other partitions.

Figure 12:
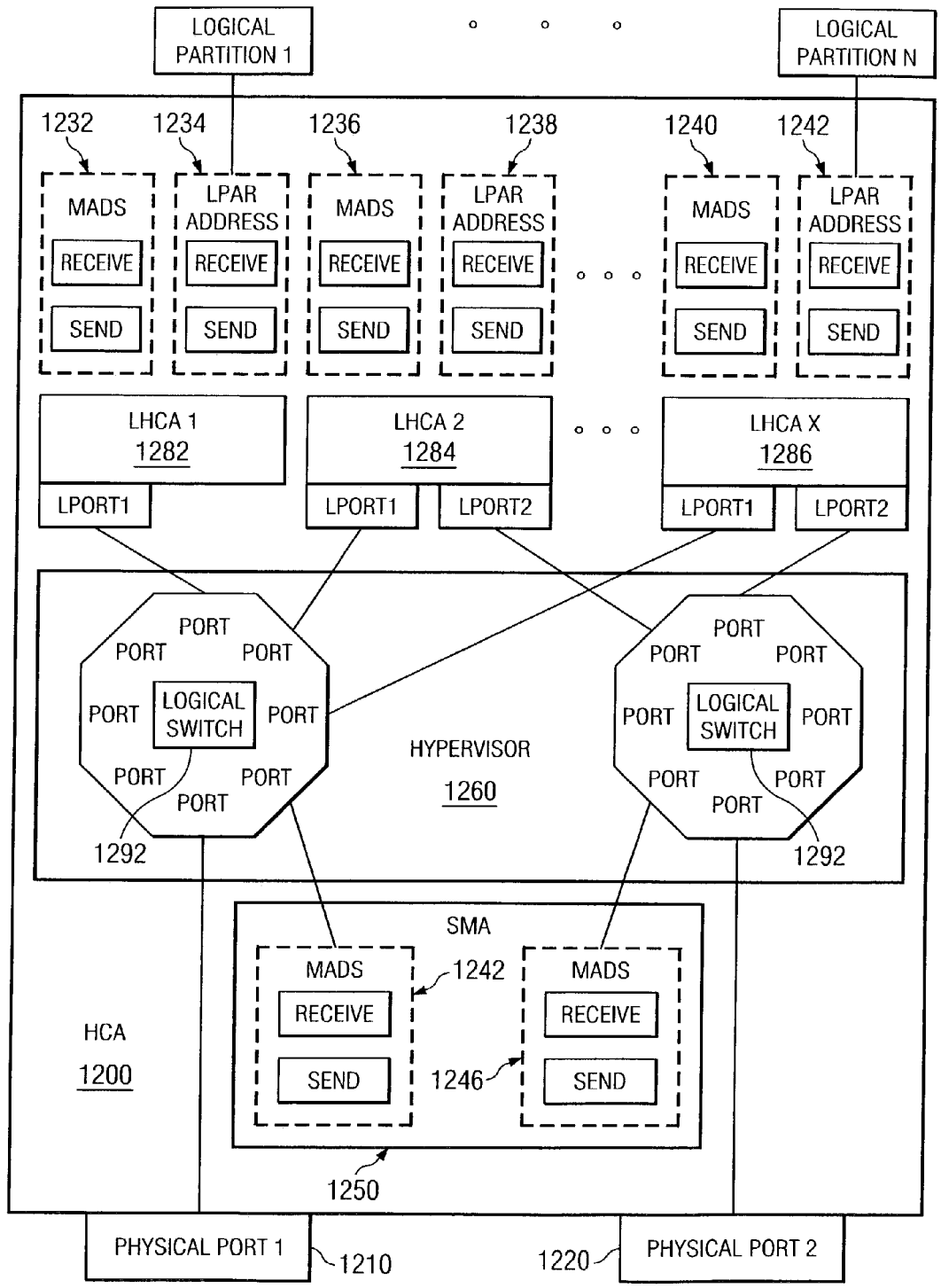
FIG. 12 is an exemplary diagram illustrating a logically partitioned host channel adapter according to the present invention.

FIG. 12 is an exemplary diagram of a physical host channel adapter illustrating the logical elements supported by the physical host channel adapter. The host channel adapter shown in FIG. 12 corresponds to the host channel adapter illustrated in FIG. 3A but with the enhancements of the present invention to provide for logical partition support within the host channel adapter.

As shown in FIG. 12, the host channel adapter (HCA) 1200 includes two physical ports 1210 and 1220 similar to the host channel adapter shown in FIG. 3A. In addition, queue pairs 1232–1242 are provided on the HCA 1200 for the sending of data packets to, and receiving data packets from, host system resources. Additional facilities are provided which permit the logical switches and logical HCAs to appear as normal switches and HCAs to an external Subnet Manager.

Resources of the host system are logically partitioned into logical partitions LPAR1 through LPARn in a manner generally known in the art. In order for each LPAR to have an architecturally accurate view of the host channel adapter, the hypervisor creates the image of a logical host channel adapter with one or more logical ports attached to a logical switch that in turn is connected to the physical port of the physical host channel adapter. The actions taken to do this involve allocating individual host channel adapter resources, such as queue pairs, completion queues, event queues, transmit and receive data counters, and memory translation table entries to each logical host channel adapter/logical port. These allocations do not typically happen simultaneously as resource requests from application are dynamic over time. However, as each resource is allocated, the hypervisor assigns the logical partition identifier of the owning logical partition to the resource in order to verify ownership rights during operation.

Returning to FIG. 12, certain ones of the queue pairs in the HCA are associated with the logical partitions LPAR1 to LPARn by way of a logical partition identifier assigned by hypervisor 1260. For example, when an operating system of a logical partition requests the use of a queue pair that is not otherwise assigned to another logical partition, that queue pair will be assigned a logical partition identifier corresponding to the logical partition of the operating system. In this way, only the hypervisor (which is trusted software that may access any HCA resource), the operating system, and user applications associated with the logical partition of the operating system may access the queue pair. Furthermore, the operating system and applications of the logical partition view the system as being dedicated to that operating system and applications and do not have knowledge of the other logical partitions.

Resources having the same logical partition identifier comprise a logical partition of the HCA. The concept used in logical partitioning gives each operating system the view that they are operating in their own address space. The HCA hardware, however, is required to access data structures maintained both internally to the hardware as well as located in system memory at real memory addresses. Using the logical partition identifier associated with HCA resources along with the built-in HCA hardware checking, gives the hardware the means to ensure that all accesses it makes on behalf of work request stimuli (via queue pairs) are indeed valid for the requesting logical partition.

Each logical partition has its own address space to prevent access to the hardware resources of the logical partition by unauthorized software. Only the hypervisor, which is trusted code and has the highest privileges for accessing hardware resources, the operating system of the logical partition, and applications within the logical partition may access resources of the HCA that are assigned to the logical partition.

In order to direct incoming data packets to an appropriate logical partition in the HCA and to direct outgoing data packets to an appropriate physical port from logical partitions, each logical partition includes a logical HCA 1282–1286 with logical ports, logical switches associated with physical ports 1292–1294, and a logical switch control point within the subnet management agent 1250. The Subnet Manager is capable of assigning unique logical identifiers (LIDs) and global identifiers (GIDs) to the logical HCA ports, and the hypervisor updates queue pair facilities to associate each queue pair with a LID and GID. The hypervisor 1260 maintains one or more tables for that identify the unique LIDs and GIDs for the resources of each logical partition.

In other words, each logical port has an associated LID/GID. The logical port belongs to a logical host channel adapter that has been assigned to a logical partition. The queue pairs 1232–1242 are associated with particular logical ports. In this way, each logical partition operates as if it had its own logical host channel adapter 1282–1286.

Each logical host channel adapter 1282–1286 may have a plurality of queue pairs 1232–1242 assigned to a logical partition which have attributes that are configured to provide access to multiple physical ports 1292–1294. Since each queue pair 1232–1242 may send data packets to and receive packets from a plurality of physical ports 1292–1294, each queue pair 1232–1242 provides facilities which indicate the physical port to which it is associated.

Each physical port 1292–1294 also provides additional facilities which are used to control whether packets to a particular Destination LID are routed out the physical port 1292–1294 or to a queue pair contained within the HCA 1200. That is, the HCA hardware uses the port facilities to check inbound packets that are sent to a particular queue pair 1232–1242 to ensure that they meet the queue pair attributes. HCA hardware also uses the port facilities to check outbound packets to determine whether the destination is another queue pair 1232–1242 within the physical HCA 1200, in which case the packet is routed to the internal queue pair 1232–1242. The HCA hardware performs this check by looking at the destination logical identifier (DLID) to see if the DLID is assigned to a logical port defined on a logical host channel adapter 1282–1286 that is supported by this physical host channel adapter 1200. These internally routed packets are also checked to ensure they also meet the destination queue pair's attributes. Both the queue pair facilities and the port facilities are maintained by the hypervisor software and create the logical view that a switch exists between the queue pair and the physical port.

These logical switches are illustrated in FIG. 12 as items 1296–1298. As discussed previously, for incoming data packets, the logical switches 1296–1298 of the hypervisor 1260 operate to perform a lookup of attribute values set forth in data packet headers with queue pair attributes to determine which queue pair the data packet should be written to. For outgoing data packets, the logical switches 1296–1298 of the hypervisor 1260 operate to perform a lookup to determine which physical port 1210–1220 to send the data packet to or whether the data packet is to be sent to another queue pair within the same physical HCA 1200. These internally routed packets are also checked to ensure they also meet the destination queue pair's attributes.

The hypervisor 1260 provides virtual address translation and protection tables whose entries are associated with individual logical partitions of the HCA resources. That is, each facility may have an entry in the virtual address translation and protection tables and that entry may be associated with a particular logical partition. By providing for separate logical partitions in the virtual address translation and protection tables, direct memory access (DMA) operations associated with an operating system's queue pairs are constrained to the authorized memory spaces of that queue pair. Thus, for example, an application in logical partition 1 may not access resources of logical partition 2 since the address of the resource of logical partition 2 is not associated with logical partition 1 in the virtual address translation and protection tables. In other words, the addresses of resources in logical partition 2 will be out of range in the virtual address translation and protection tables of logical partition 1.

Therefore, each logical partition is kept separated from each other logical partition by way of the separate entries in the virtual address translation and protection tables. However, the operating systems and applications of one logical partition may communicate with the operating system and applications of another logical partition or with external devices via normal InfiniBand protocols.

As mentioned previously, the hypervisor 1260 is responsible for assigning logical partition identifiers to queue pairs. This logical partition identifier groups queue pairs and their associated HCA resources into logical partitions. This logical partition identifier is further used to perform checks when a completion queue entry (CQE) or event queue entry (EQE) is generated from a work queue entry (WQE) of a particular queue pair.

Additional information about the logical partitioning of a HCA to facilitate logical partitions in host systems may be obtained from commonly assigned and co-pending U.S. patent application Ser. No. 10/411,448 entitled "APPARATUS, SYSTEM AND METHOD FOR PROVIDING MULTIPLE LOGICAL CHANNEL ADAPTERS WITHIN A SINGLE PHYSICAL CHANNEL ADAPTER IN A SYSTEM AREA NETWORK," filed on Apr. 10, 2003, which is hereby incorporated by reference.

As discussed above, the host channel adapter (HCA) typically includes storage facilities necessary to support multiple queue pairs (QPs), completion queues (CQs), event queues (EQs), and memory regions (MRs). The term "facility" as it is used herein refers to any hardware resource, such as a register. A queue pair is typically assigned to a user program running on the host processor. In addition groups of queue pairs, completion queues, event queues, memory regions, etc., may be assigned to a logical partition as discussed previously.

It is desirable to permit only the program associated with a particular queue pair, access to the queue pair's facilities within the HCA. Furthermore, it is desirable to permit only the operating system and user applications assigned to a logical partition, access to the HCA facilities associated with that logical partition. In this way, the operating system and user applications of one logical partition cannot interfere with the functioning of the operating system and user applications of another logical partition. Moreover, if there is a failure or fault in one logical partition, the failure or fault is isolated to that particular logical partition and does not interfere with the functioning of the other logical partitions. The present invention provides a mechanism for controlling access to HCA facilities so that only the user applications and operating system of a logical partition, or trusted code, such as the hypervisor, may access HCA facilities of a given logical partition.

As previously mentioned, the present invention is directed to an improved apparatus, system and method for use with a system area network, such as an InfiniBand network, in which logical partitioning is supported by host channel adapters (HCAs) of the system area network. With the present invention, access to HCA facilities is controlled through the assignment of usage classes and memory space mappings. With the present invention, access to HCA facilities is permitted only if the operating system or application is permitted to access a corresponding page of memory and has a usage class that is sufficient to access the HCA facility.

Access to a corresponding page of memory is controlled through an address translation mechanism in which virtual addresses are translated to real addresses of a system memory address space. Based on an identification of the requestor, e.g., an application, operating system, trusted code, etc., the address translation mechanism may determine whether the requestor is permitted to access the page of system memory to which the virtual address maps. The identification may be, for example, a logical partition identifier, or the like. In this way, requestors from one logical partition may not access pages of system memory that are allocated to different logical partitions.

Assuming that the requestor is able to access the page of system memory associated with the virtual address, the real address corresponding to the virtual address is obtained from this page of system memory and used to access a usage class page of system memory address space allocated to a queue pair, completion queue, event queue, or memory region. The particular usage class page that is accessed using the real address identifies the usage class of the requestor. Moreover, the usage class page includes a listing of the HCA facilities that may be accessed by requestors having the corresponding usage class. A comparison of an identifier of the facility to which access is requested and the identifiers of HCA facilities in the usage class page is then performed. If the identifier of the facility to which access is requested matches an identifier of an HCA facility in the usage class page, then access, e.g., writing or reading, to the HCA facility is granted. Otherwise, access is denied.

In a preferred embodiment, four classes of usage are defined: the user class, privileged class, real address class, and super privileged class. User class resources are those resources that are required to be directly accessible to user programs. Resources in this class can only affect a single queue pair, completion queue, event queue, or memory resource.

Privileged class resources are those resources that are to be protected from user programs but accessible to the operating system and firmware running on the logical partition associated with the resource. Resources in this class are those that are not required to be made directly accessible to user programs and which can only affect a single logical partition.

Real address class resources are those HCA resources that contain a real address. The same access requirements as the privileged class are required for real address class resources. This usage class is used to support virtual machine applications and flags resources as having real addresses that must be translated from a logical partition real address to a system real address.

Super privileged class resources are resources that are protected from both user programs and the operating system running on any logical partition. Resources in this class are those that affect the overall host channel adapter. Only trusted applications, such as the hypervisor, may access resources having a super privileged class.

While the preferred embodiments of the present invention makes use of four usage classes as noted above, the present invention is not limited to such and any number of usage classes may be used without departing from the spirit and scope of the present invention. For example, if virtual machine applications need not be supported, the real address class may be eliminated. Moreover, other usage classes may be used in conjunction with, or in replacement of, one or more of the usage classes described above.

The usage classes defined above provided a hierarchical structure of access rights which may be assigned to resources of a host channel adapter. For example, super privileged resources can only be access by the hypervisor of a host channel adapter. Privileged (and Real Address) class resources can only be accessed by the operating system of the partition to which they are assigned and the hypervisor. User space resources can be accessed by their associated user program, partition operating system, and the hypervisor. This hierarchical access rights structure is illustrated in Table 1 below which is organized in an increasing order of access rights.

TABLE 1

| Hierarchy of Usage Classes | |
| --- | --- |
| Usage Class | Allowable Program Access |
| User | User programs |
| | Partition OS |
| | Hypervisor |

TABLE 1-continued

| Hierarchy of Usage Classes | |
| --- | --- |
| Usage Class | Allowable Program Access |
| Privileged | Partition OS |
| | Hypervisor |
| Real Address | Partition OS |
| | Hypervisor |
| | This is a separate class used to indicate a need to translate the real address contained within the associated resource. It is used to support virtual machine (VM) applications. |
| Super Privileged | Hypervisor |

Having established a hierarchical usage class scheme, this hierarchical usage class scheme is implemented in the host channel adapter through the assignment of memory pages in system memory address space to queue pairs, completion queues, event queues, memory regions, and the like. That is, the address for the facilities of each individual queue pair, completion queue, event queue and memory region are mapped to different pages of system memory address space. For each queue pair, completion queue, event queue and memory region, four pages of the system memory address space are allocated—one for each usage class. These pages of system memory address space are populated with the addresses of the facilities of the queue pair, completion queue, event queue or memory region that may be accessed by requestors having a corresponding usage class associated with them.

In one embodiment of the invention, the HCA includes four base address registers (BAR) for queue pair (QP) facilities, four BARs for completion queue (CQ) facilities, four BARs for event queue (EQ) facilities, and four BARs for memory region (MR) facilities. The four QP BARs are used to define the starting page address for all of HCA's QP user spaces, privileged spaces, real address spaces and super privileged spaces. Likewise for the CQ, EQ and MR spaces. The length of each of these BAR spaces is equal to the number of QPs, CQs, EQs or MRs times the system page size.

FIG. 13 illustrates an example of a BAR spaces in a system memory address space of the HCA according to the present invention. As shown in FIG. 13, each queue pair, completion queue, event queue and memory region has a dedicated page of system memory address space for each of the different usage classes. A BAR stores the base address for the pages associated with in the user address space, privileged address space, real address space and super privileged address space for queue pairs, completion queues, event queues and memory regions. As a result, in a preferred embodiment, there are 16 BARs. The specific pages for each usage space may be identified based on the BAR and an offset into the BAR space associated with the BAR. The size of each BAR space is the number of queue pairs, completion queues, event queues or memory regions, depending on the particular BAR space, multiplied by the system memory address space page size.

FIG. 14 illustrates an expanded view of the system memory address space pages assigned to an exemplary queue pair according to the present invention. As shown in FIG. 14, each page of system memory contains a listing of addresses for facilities of the queue pair that may be accessed by a requestor having an associated usage class. As shown, a first set of queue pair facility addresses are provided in page 1 associated with a user address space usage class. A second set of queue pair facility addresses are provided in page 2 associated with a privileged address space. Because the usage classes are hierarchical such that applications and operating systems having a privileged address space have higher access rights than user address space applications, the second set of queue pair facilities includes the queue pair facilities identified in page 1 with the addition of other queue pair facilities that are only accessible by applications and operating systems having a privileged address space usage class or higher.

This same scheme continues with a third set of queue pair facility addresses being provided in page 3 associated with a real address space usage class. This third set of queue pair facility addresses includes only those queue pair facilities that store real addresses that need to be converted to system memory addresses. Thus, this third set of queue pairs may include queue pair facilities in the first or second sets, and/or other queue pair facilities not included in the first or second sets.

A fourth set of queue pair facility addresses are provided in page 4 associated with the super privileged address space. This fourth set of queue pair facilities will include queue pair facility addresses for all of the queue pair facilities on the HCA since the super privileged address space is the most privileged address space available. Typically, trusted code, such as the hypervisor, is the only application allocated the super privileged address space usage class.

Figure 15:
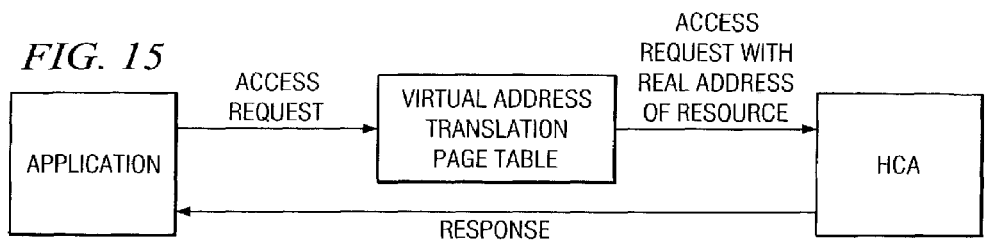
FIG. 15 illustrates the overall operation of an exemplary embodiment of the present invention when determining whether a requestor of access to an HCA facility should be provided with access to the HCA facility.

FIG. 15 illustrates the overall operation of the present invention when determining whether a requestor of access to an HCA facility should be provided with access to the HCA facility. As shown in FIG. 15, an access request is sent to a host system processor 1520 by an application 1510. The access request includes a virtual address for which access is desired, such as a write or read operation to the virtual address.

This access request is handled by a virtual address translation page table 1530 of the host system processor. The virtual address translation page table 1530 performs a lookup in the page table to determine a real address associated with the virtual address. A determination is then made as to whether the application 1510 may access the system memory address space page of the real address. For example, this determination may be made by determining whether a logical partition identifier of the application 1510 corresponds to a logical partition identifier associated with the system memory address space page of the real address. Alternatively, a standard page access control mechanism known in the art may be used to determine whether the application 1610 may access the system memory address space page of the real address.

If the application 1510 may access the system memory space page of the real address, then the real address is sent to the HCA 1540. The HCA consults the pages associated with each queue pair, completion queue, event queue, or memory region based on the type of access requested, e.g., write a queue pair user facility, write a queue pair privileged facility, write a super privileged completion queue facility, etc. For example, the HCA may compare the BAR with a received real address. Since each different type of resource (QP, CQ, EQ, etc.) has it's own set of four BARs, by determining which of the BARs matches the received address, the HCA determines which resource is being accessed.

The HCA 1540 determines if the real address appears in one of the page tables for the QP, CQ, EQ or MR. If so, the associated usage class required to access the HCA facility is identified and compared against the usage class of the application 1510. That is, each resource type, e.g., queue pairs, have their own four BARs, with a BAR corresponding to each of user, privileged, real and super privileged access classes. The real address is compared to the BARs to determine what the access class of the request is. If the particular facility, e.g., a register, being addressed by the access is addressable from within that access class, the access will be allowed.

If the usage class of the application 1510 is sufficient to access the HCA facility, i.e. is the same as the required usage class or higher, then access to the HCA facility is granted. Otherwise, access to the HCA facility is not granted.

Thus, with the present invention a two level protection mechanism is provided for protecting HCA facilities from unauthorized access. With the present invention, a first level of access is provided through virtual address translation and a mechanism for determining if the requestor of access may access a system memory address space page associated with a real address to which the virtual address maps. A second level of access is provided through the allocation of usage classes and determining a required usage class for accessing an HCA facility.

Figure 16:
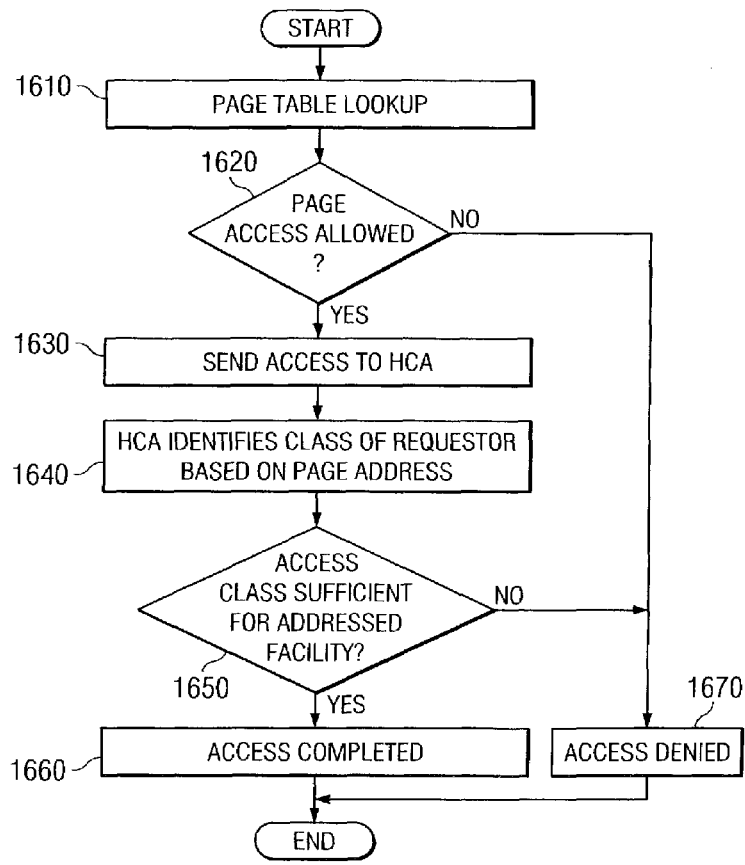
FIG. 16 is a flowchart of an exemplary process used for determining if access to an HCA facility should be granted in accordance with a preferred embodiment of the present invention.

With reference now to FIG. 16, a flowchart of a process used for determining if access to an HCA facility should be granted is depicted in accordance with a preferred embodiment of the present invention. A first portion of the process illustrated in FIG. 16 may be implemented in a host system having virtual address translation and a second portion of the process illustrated in FIG. 16 may be implemented in a host channel adapter coupled to the host system.

The process begins by performing a page table lookup (step 1610) for virtual address to real address translation. Based on the real address to which the virtual address maps, a determination is made as to whether page access is allowed (step 1620). If access to the page is allowed, the real address is sent to the HCA (step 1630). Steps 1610–1630 may be performed, for example, in the host system.

The HCA identifies the class of requestor based on the page address (step 1640). Next, a determination is made as to whether the class accessed is sufficient for the addressed facility (step 1650). If the class accessed is sufficient for the addressed facility, the access is completed (step 1660) and the process terminates thereafter.

Returning again to step 1650, if the class accessed is not sufficient for the addressed facility, access is denied (step 1670) and the process terminates thereafter. Referring again to step 1620, if access to the page is not allowed, the process proceeds to step 1670 as described above.

By using the present invention, unauthorized access to HCA facilities is prevented in a logically partitioned system. With the present invention, since applications and operating systems from one logical partition may not access HCA facilities associated with a different logical partition, these applications and operating systems are prevented from compromising the operation of applications and the operating system of the logical partition associated with these HCA facilities. Furthermore, the failure or fault in the operation of an application or operating system is isolated to the HCA facilities associated with the logical partition of the application or operating system and thus, the other logical partitions are not affected.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method of controlling access to host channel adapter facilities, comprising:
    receiving a request from a requestor for access to a host channel adapter facility, the request including an address;
    identifying a page of memory associated with the address;
    determining a usage class of the requestor based on the identification of the page of memory; and
    controlling access to the host channel adapter facility based on the usage class of the requestor, wherein the usage class is a usage class from a hierarchical set of usage classes identifying increasing levels of access to host channel adapter facilities.

2. The method of claim 1, wherein the usage class is one of user address space, privileged address space, real address space, and super privileged address space.

3. The method of claim 1, wherein controlling access to the host channel adapter facility includes:
    determining an identifier of the host channel adapter facility from the request;
    determining if the identifier of the host channel adapter facility is stored in the page of memory; and
    granting access to the host channel adapter facility only if the identifier of the host channel adapter facility is stored in the page of memory.

4. The method of claim 1, wherein the page of memory is one of a plurality of pages, each page of the plurality of pages being associated with one usage class from the set of usage classes.

5. The method of claim 1, further comprising:
    receiving the request in a host system processor, the request further including a virtual address;
    performing a virtual address to real address translation to identify a page of system memory associated with the virtual address;
    determining if the requestor may access the page of system memory; and
    sending the request to the host channel adapter only if the requestor may access the page of system memory.

6. The method of claim 1, wherein the usage class is a user address space usage class in which any one of a user application, an operating system, and a hypervisor may access host channel adapter facilities associated with to user address space usage class.

7. The method of claim 1, wherein the usage class is a privileged address space usage class in which any one of an operating system and a hypervisor may access host channel adapter facilities associated with the privileged address space.

8. The method of claim 1, wherein the usage class is a super privileged address space usage class in which only the hypervisor may access host channel adapter facilities associated with the super privileged address space usage class.

9. The method of claim 1, wherein the address is an address of a queue pair in the host channel adapter, and wherein identifying a page of memory associated with the address includes identifying a plurality of pages of memory associated with the queue pair.

10. The method of claim 1, wherein the page of system memory is one of a plurality of pages of system memory, and wherein the plurality of pages of system memory include a set of pages of system memory for each queue pair facility, each completion queue facility, each event queue facility, and each memory region facility allocated on the host channel adapter.

11. The method of claim 1, wherein the page of system memory is identified based on a base address register and an offset for one of a set of pages of system memory for queue pair facilities, a set of pages of system memory for completion queue facilities, a set of pages of system memory for event queue facilities, and a set of pages of system memory for memory region facilities.

12. A computer program product stored in a computer readable, recordable-type medium for controlling access to host channel adapter facilities, comprising:
    first instructions for receiving a request from a requestor for access to a host channel adapter facility, the request including an address;
    second instructions for identifying a page of memory associated with the address;
    third instructions for determining a usage class of the requestor based on the identification of the page of memory; and
    fourth instructions for controlling access to the host channel adapter facility based on the usage class of the requestor, wherein the usage class is a usage class from a hierarchical set of usage classes identifying increasing levels of access to host channel adapter facilities.

13. The computer program product of claim 12, wherein the usage class is one of user address space, privileged address space, real address space, and super privileged address space.

14. The computer program product of claim 12, wherein the fourth instructions for controlling access to the host channel adapter facility include:
    instructions for determining an identifier of the host channel adapter facility from the request;
    instructions for determining if the identifier of the host channel adapter facility is stored in the page of memory; and
    instructions for granting access to the host channel adapter facility only if the identifier of the host channel adapter facility is stored in the page of memory.

15. The computer program product of claim 12, wherein the page of memory is one of a plurality of pages, each page of the plurality of pages being associated with one usage class from the set of usage classes.

16. The computer program product of claim 12, further comprising:
- fifth instructions for receiving the request in a host system processor, the request further including a virtual address;
- sixth instructions for performing a virtual address to real address translation to identify a page of system memory associated with the virtual address;
- seventh instructions for determining if the requestor may access the page of system memory; and
- eighth instructions for sending the request to the host channel adapter only if the requestor may access the page of system memory, wherein the page of system memory is one of a plurality of pages of system memory, and wherein the plurality of pages of system memory include a set of pages of system memory for each queue pair facility, each completion queue facility, east event queue facility, and each memory region facility allocated on the host channel adapter.

17. The computer program product of claim 12, wherein the usage class is a user address space usage class in which any one of a user application, an operating system, and a hypervisor may access host channel adapter facilities associated with the user address space usage class.

18. The computer program product of claim 12, wherein the usage class is a privileged address space usage class in which any one of an operating system and a hypervisor may access host channel adapter facilities associated with the privileged address space.

19. The computer program product of claim 12, wherein the usage class is a super privileged address space usage class in which only the hypervisor may access host channel adapter facilities associated with the super privileged address space usage class.

20. The computer program product of claim 12, wherein the address is an address of a queue pair in the host channel adapter, and wherein the second instructions for identifying a page of memory associated with the address includes instructions for identifying a plurality of pages of memory associated with the queue pair.

21. The computer program product of claim 12, wherein the page of system memory is one of a plurality of pages of system memory, and wherein the plurality of pages of system memory include a set of pages of system memory for each queue pair facility, each completion queue facility, each event queue facility, and each memory region facility allocated on the host channel adapter.

22. The computer program product of claim 12, wherein the page of system memory is identified based on a base address register and an offset for one of a set of pages of system memory for queue pair facilities, a set of pages of system memory for completion queue facilities, a set of pages of system memory for event queue facilities, and a set of pages of system memory for memory region facilities.

23. An apparatus for controlling access to host channel adapter facilities, comprising:
- means for receiving a request from a requestor for access to a host channel adapter facility, the request including an address;
- means for identifying a page of memory associated with the address;
- means for determining a usage class of the requestor based on the identification of the page of memory; and
- means for controlling access to the host channel adapter facility based on the usage class of the requestor, wherein the usage class is a usage class from a hierarchical set of usage classes identifying increasing levels of access to host channel adapter facilities.

24. The apparatus of claim 23, wherein the usage class is one of user address space, privileged address space, real address space, and super privileged address space.

25. The apparatus of claim 23, wherein the means for controlling access to the host channel adapter facility includes:
- means for determining an identifier of the host channel adapter facility from the request;
- means for determining if the identifier of the host channel adapter facility is stored in the page of memory; and
- means for granting access to the host channel adapter facility only if the identifier of the host channel adapter facility is stored in the page of memory.

26. The apparatus of claim 23, wherein the page of memory is one of a plurality of pages, each page of the plurality of pages being associated with one usage class from the set of usage classes.

27. The apparatus of claim 23, further comprising:
- means for receiving the request in a host system processor, the request further including a virtual address;
- means for performing a virtual address to real address translation to identify a page of system memory associated with the virtual address;
- means for determining if the requestor may access the page of system memory; and
- means for sending the request to the host channel adapter only if the requester may access the page of system memory.

28. The apparatus of claim 23, wherein the usage class is a user address space usage class in which any one of a user application, an operating system, and a hypervisor may access host channel adapter facilities associated with the user address space usage class.

29. The apparatus of claim 23, wherein the usage class is a privileged address space usage class in which any one of an operating system and a hypervisor may access host channel adapter facilities associated with the privileged address space.

30. The apparatus of claim 23, wherein the usage class is a super privileged address space usage class in which only the hypervisor may access host channel adapter facilities associated with the super privileged address space usage class.

31. The apparatus of claim 23, wherein the address is an address of a queue pair in the host channel adapter, and wherein the means for identifying a page of memory associated with the address includes means for identifying a plurality of pages of memory associated with the queue pair.

32. The apparatus of claim 23, wherein the page of system memory is one of a plurality of pages of system memory, and wherein the plurality of pages of system memory include a set of pages of system memory for each queue pair facility, each completion queue facility, each event queue facility, and each memory region facility allocated on the host channel adapter.

33. The apparatus of claim 23, wherein the page of system memory is identified based on a base address register and an offset for one of a set of pages of system memory for queue pair facilities, a set of pages of system memory for completion queue facilities, a set of pages of system memory for event queue facilities, and a set of pages of system memory for memory region facilities.

* * * * *